Figure 1:
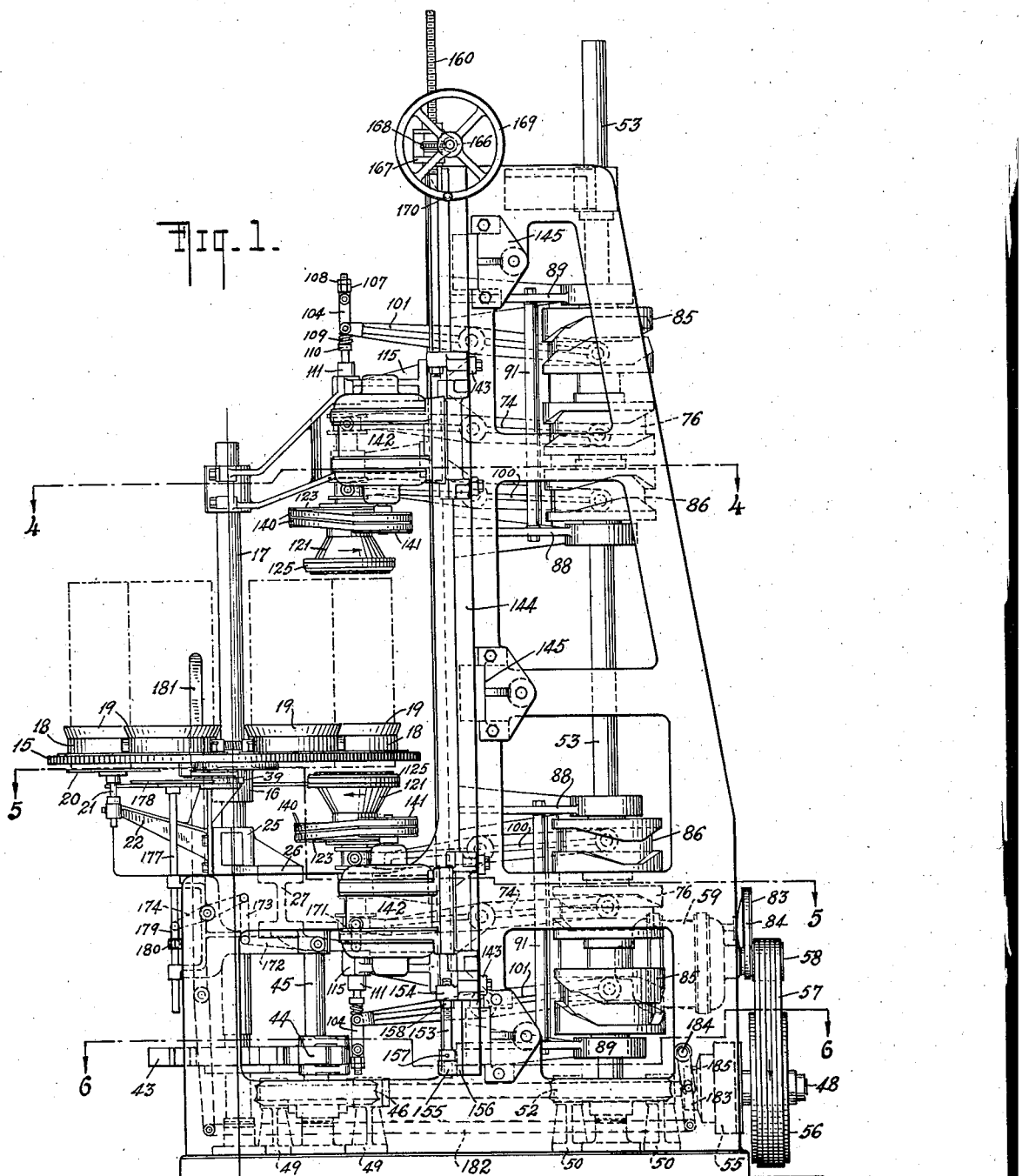

March 24, 1942.   A. F. MILLER   2,277,128
MACHINE FOR MAKING PAPER CONTAINERS
Filed Sept. 16, 1938   15 Sheets-Sheet 1

WITNESS
G. V. Rasmussen

INVENTOR
ALBERT F. MILLER
BY
Briesen Schrenk,
ATTORNEYS

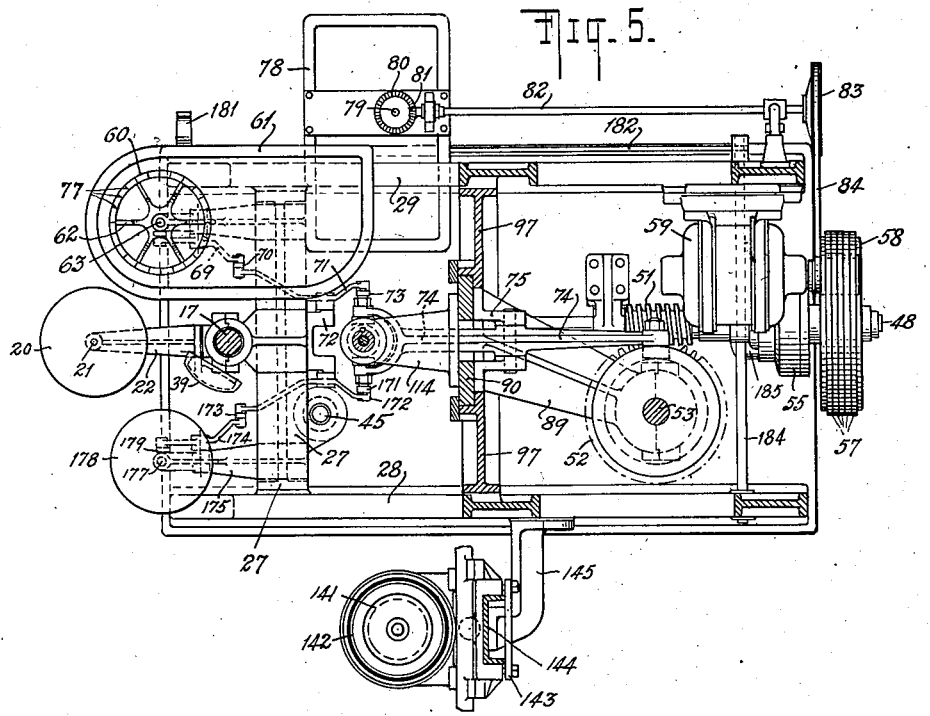
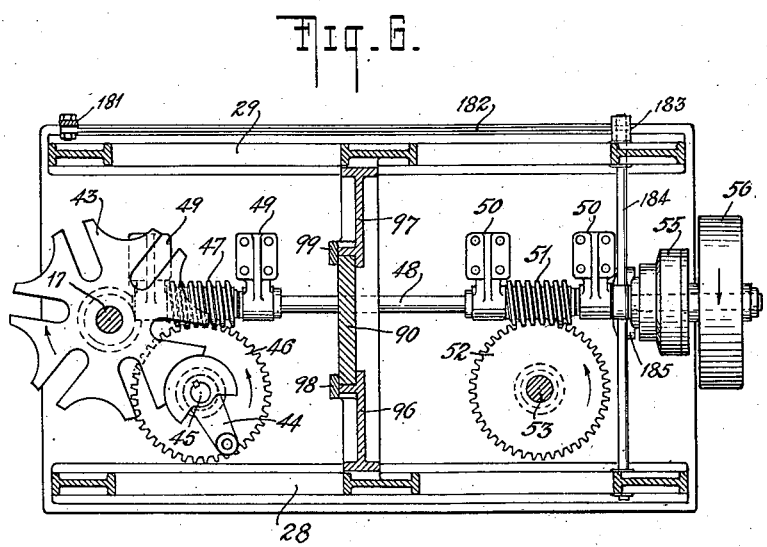

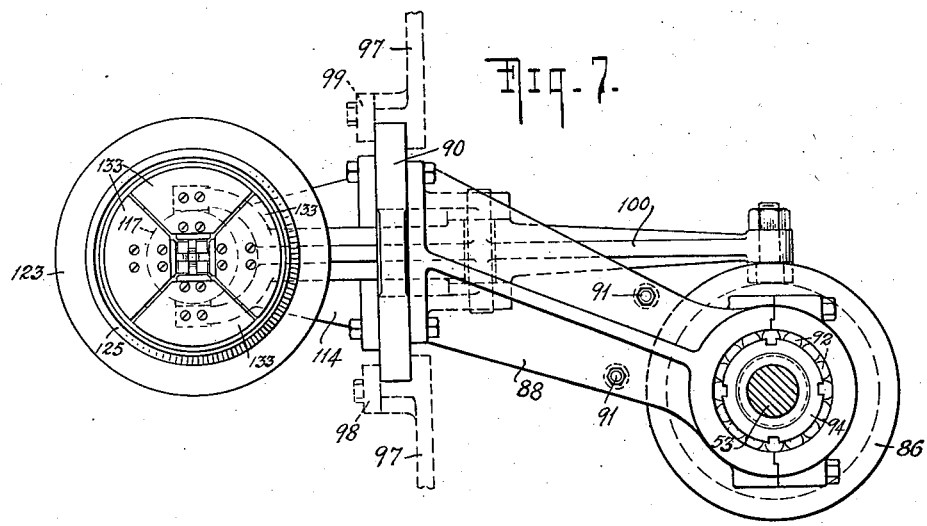
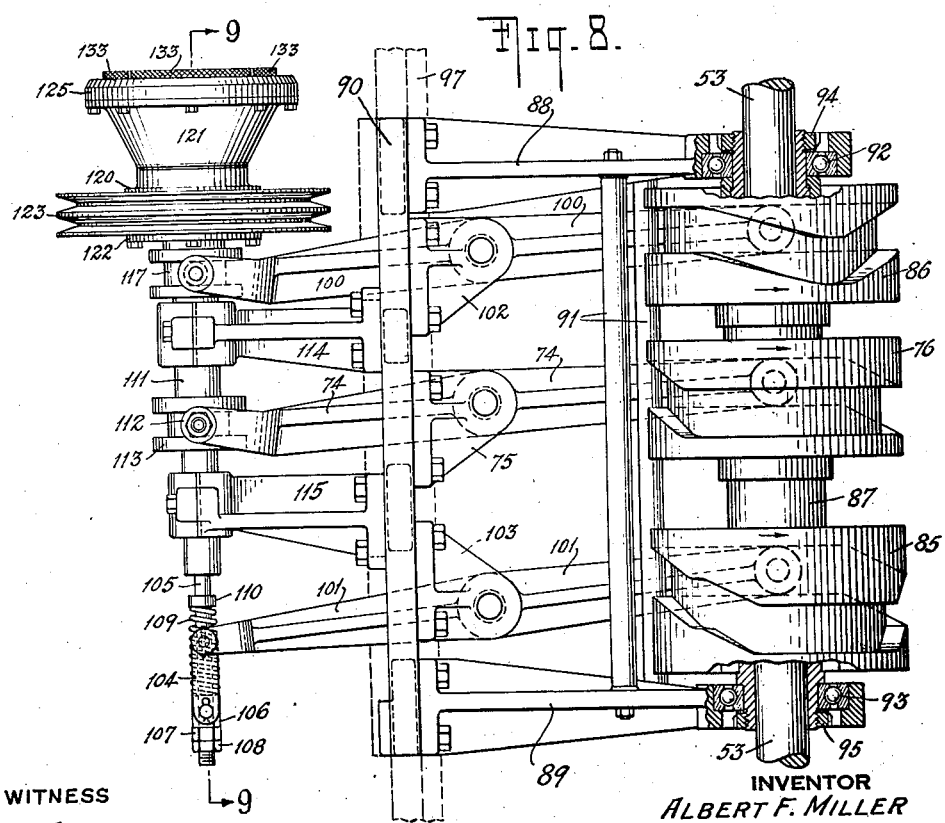

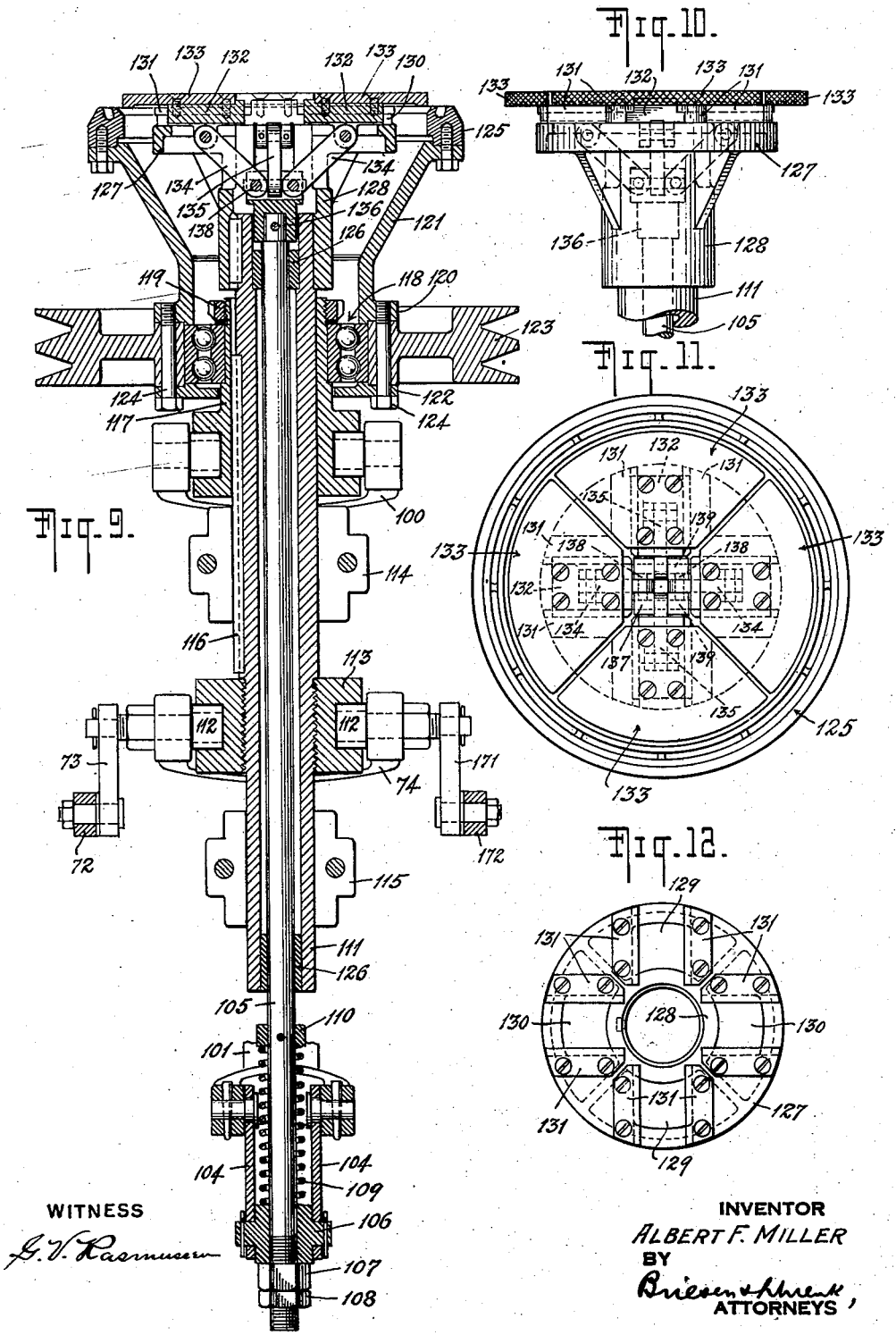

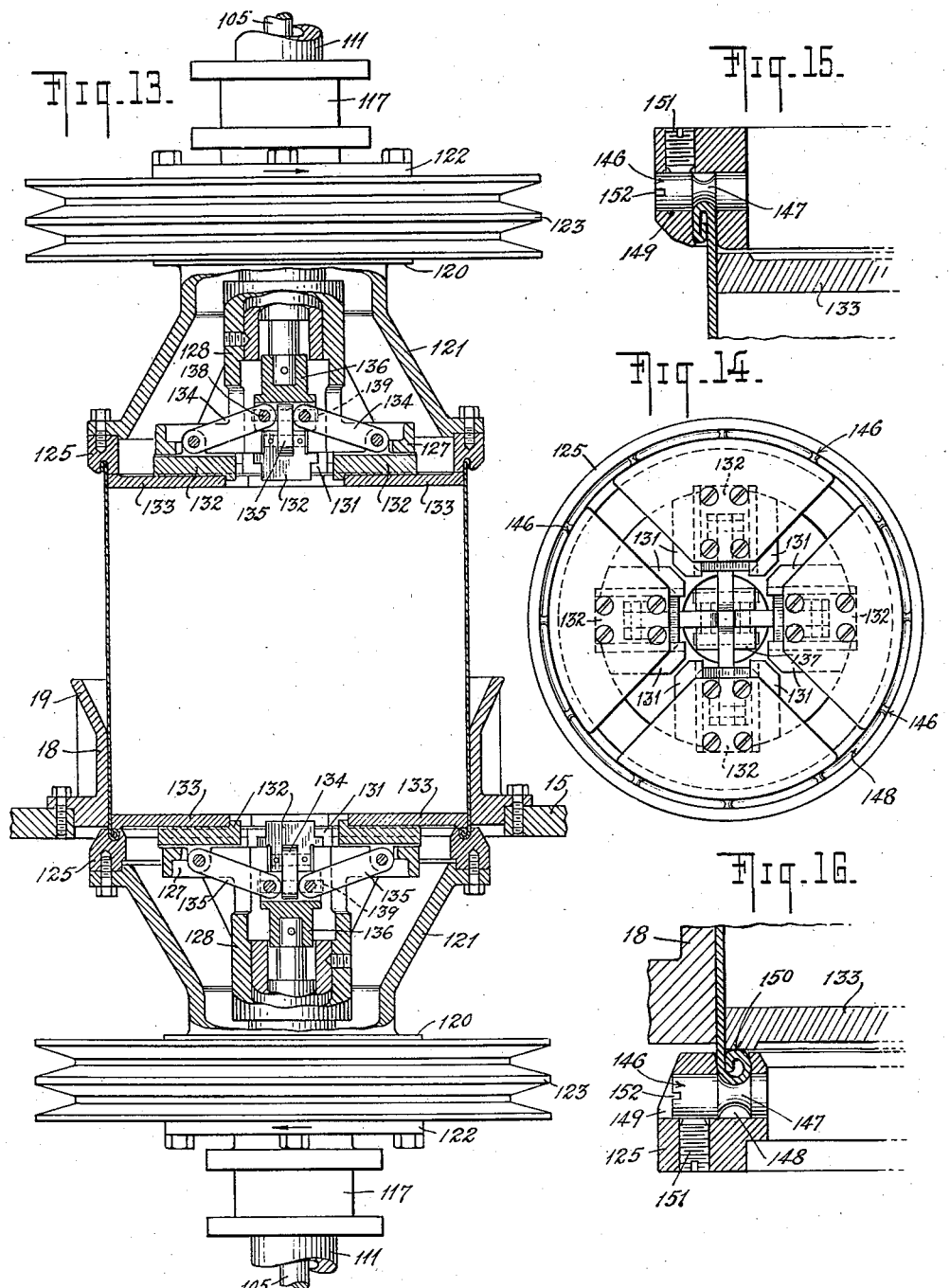

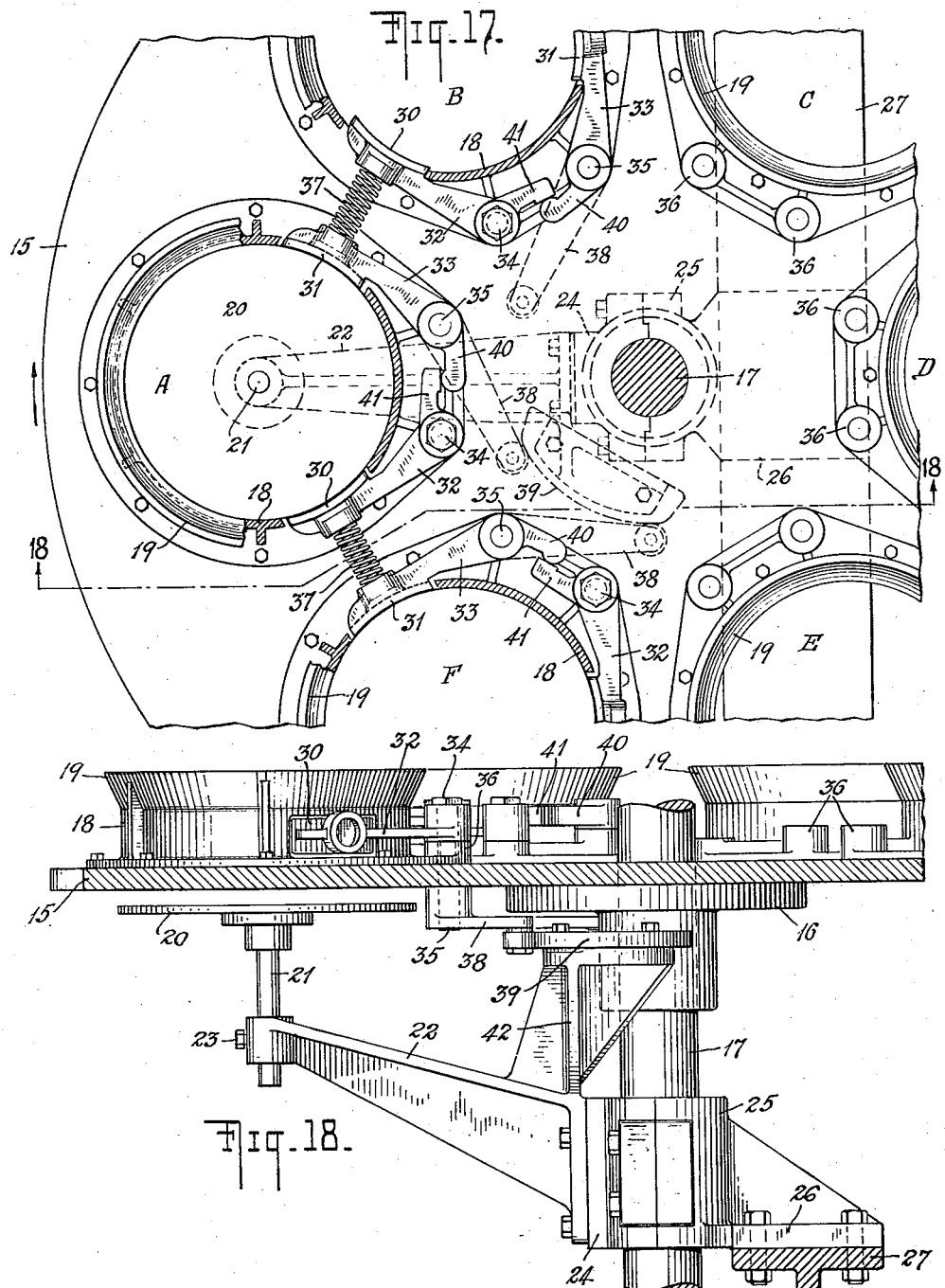

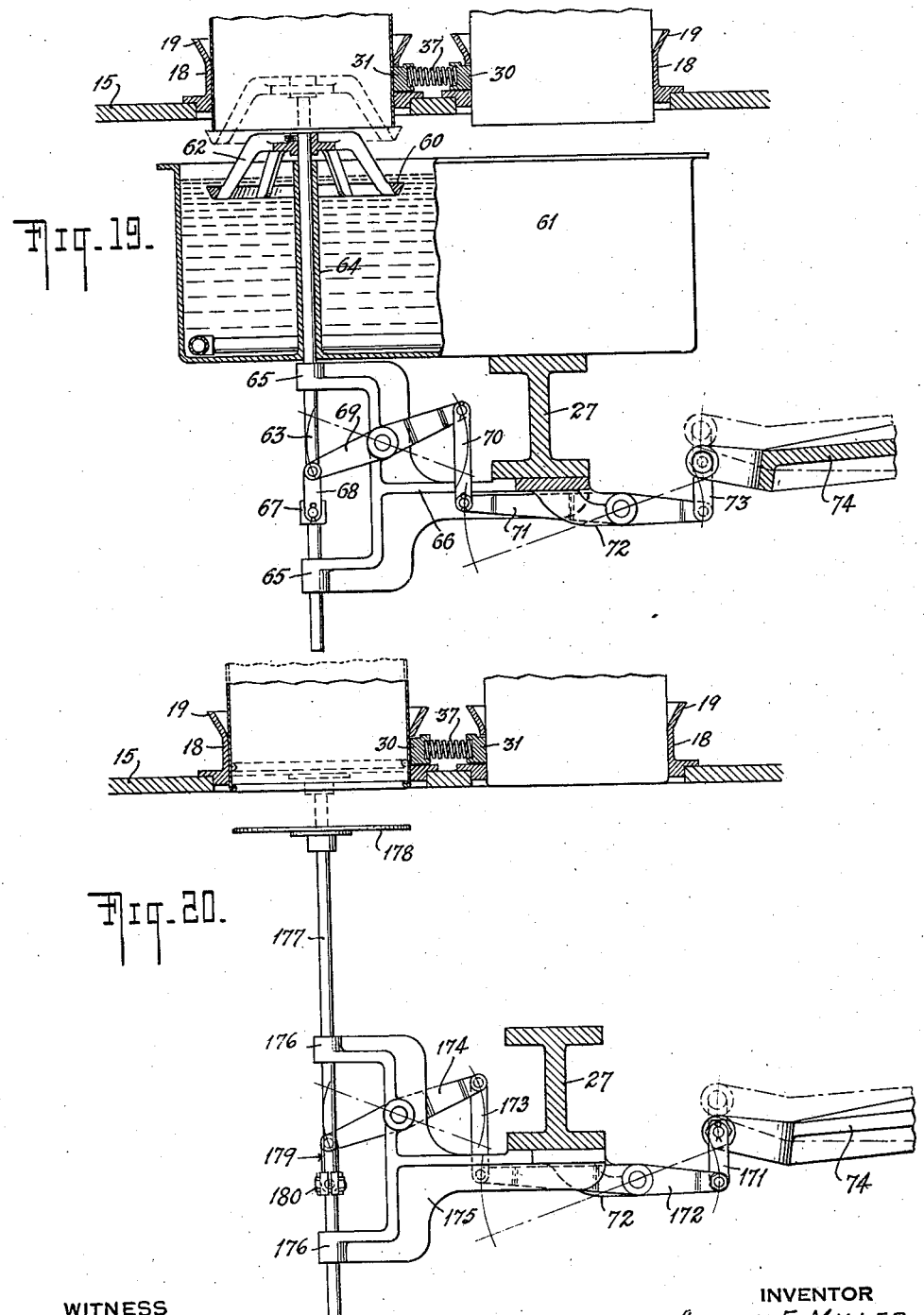

March 24, 1942.  A. F. MILLER  2,277,128
MACHINE FOR MAKING PAPER CONTAINERS
Filed Sept. 16, 1938  15 Sheets-Sheet 10
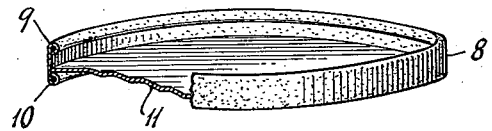
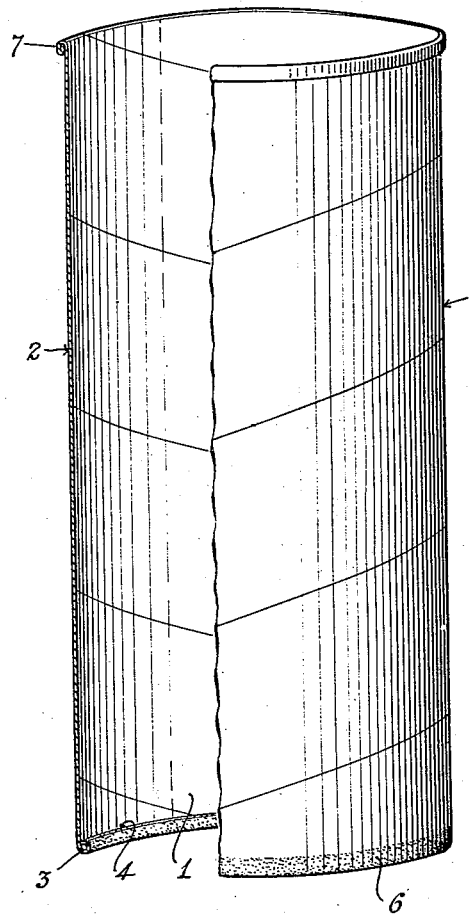
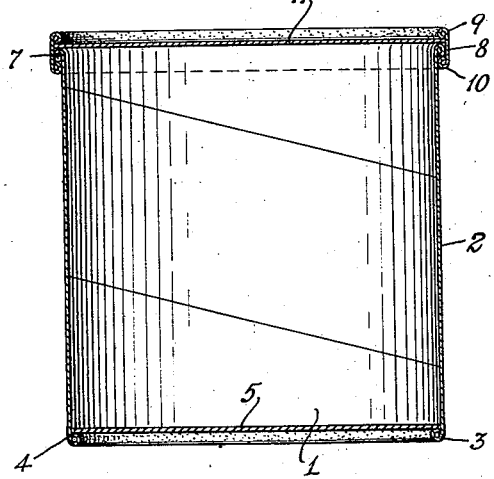
WITNESS
G. V. Rasmussen
INVENTOR
ALBERT F. MILLER
BY
Briesen & Schrenk,
ATTORNEYS

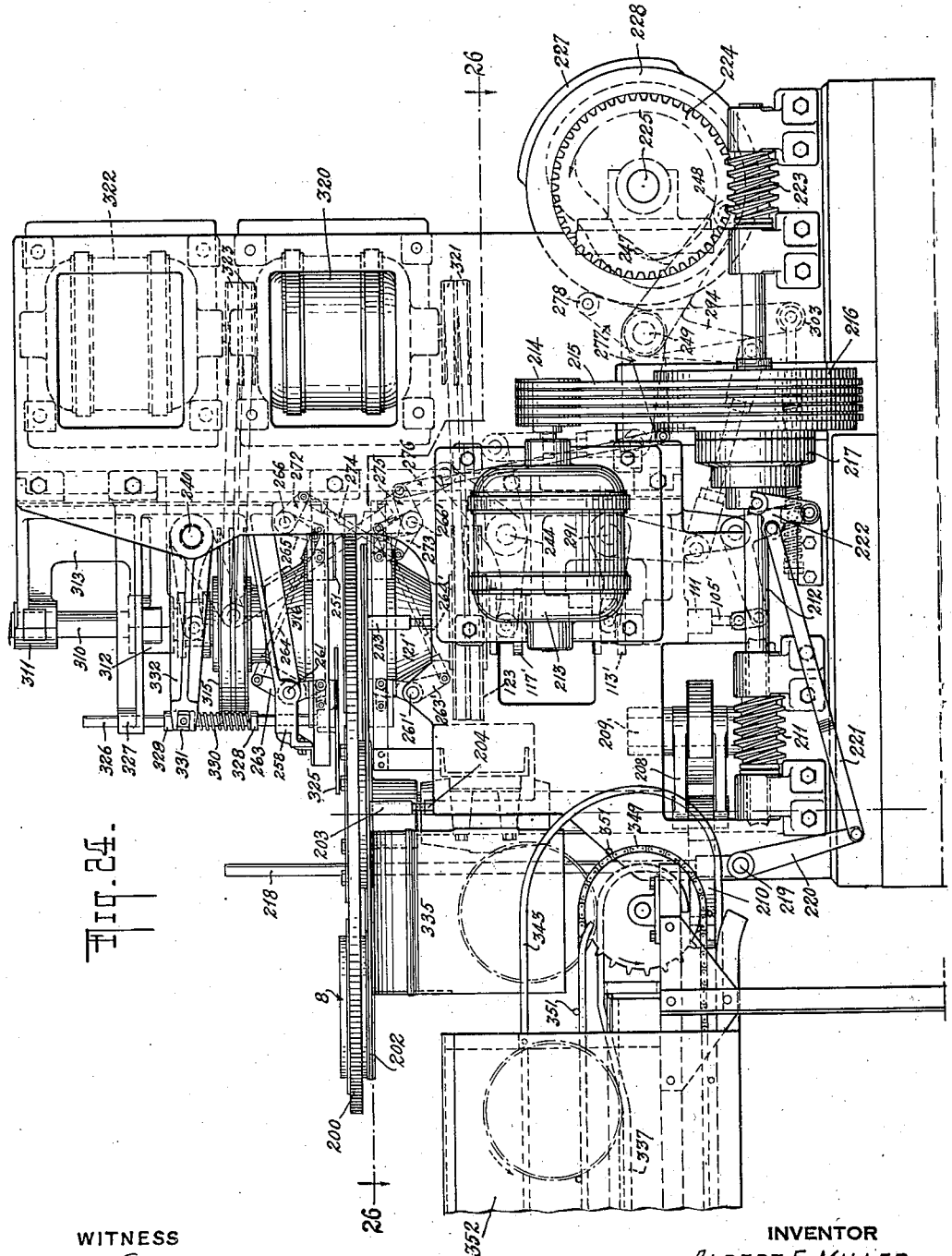

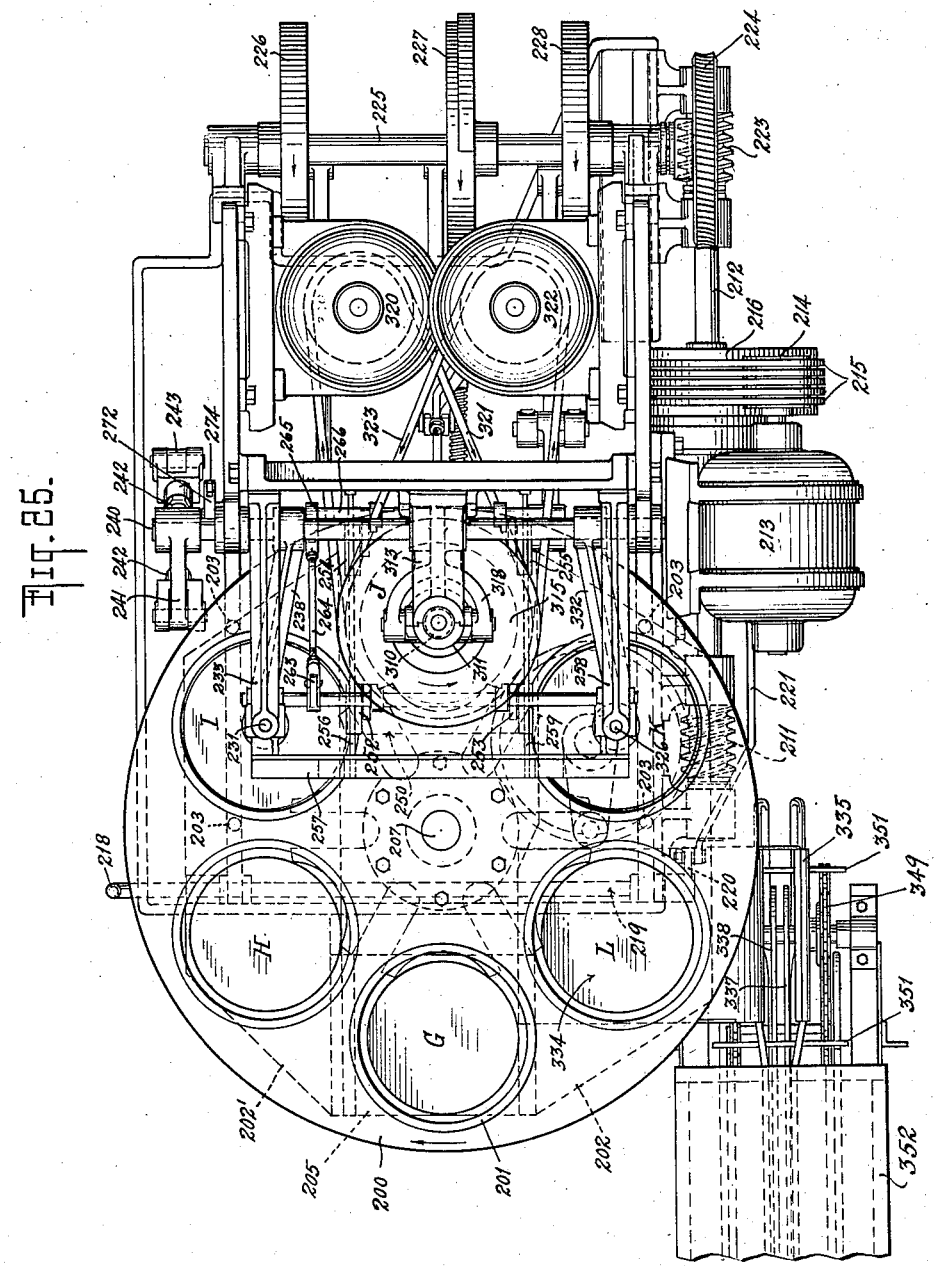

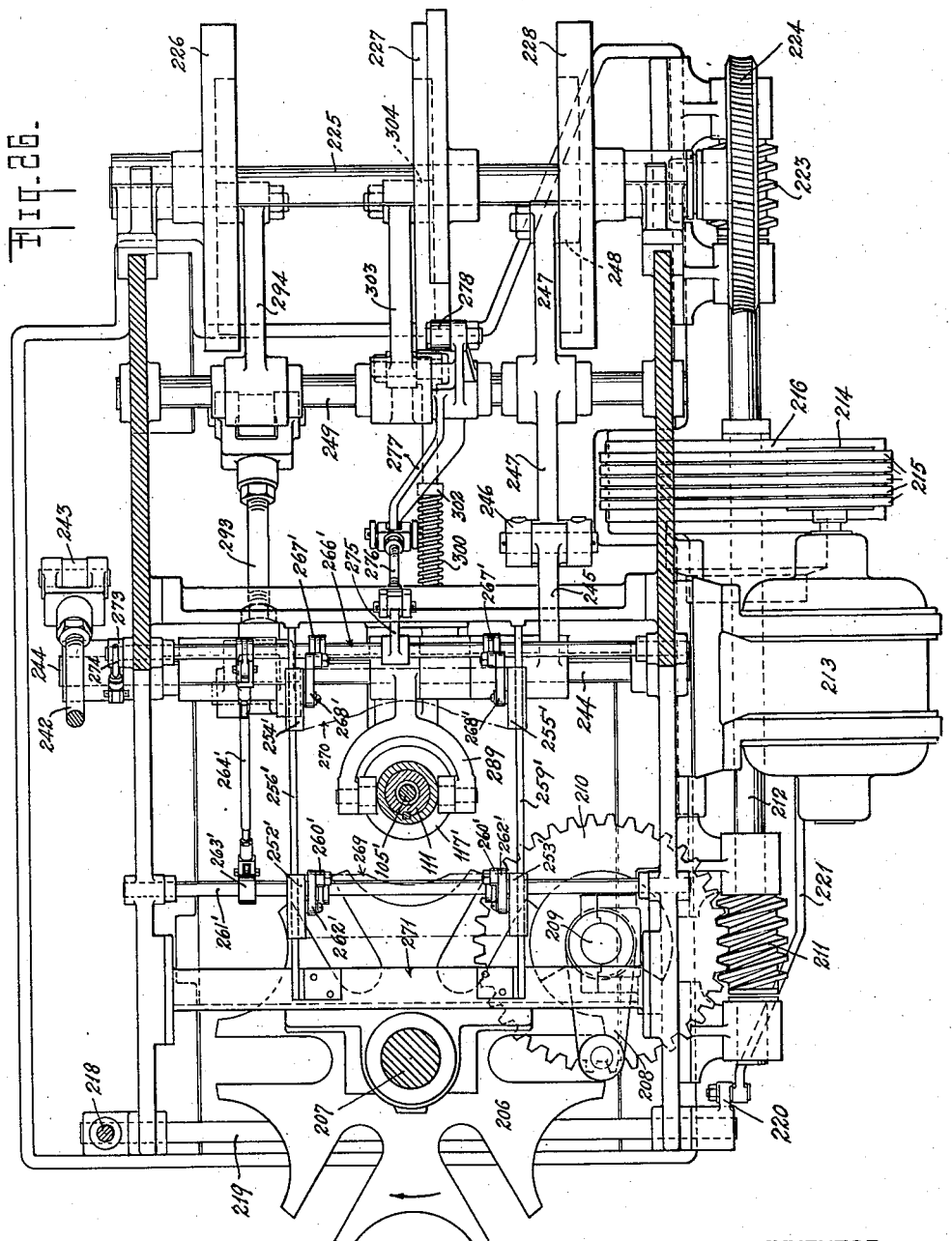

March 24, 1942. A. F. MILLER 2,277,128
MACHINE FOR MAKING PAPER CONTAINERS
Filed Sept. 16, 1938 15 Sheets-Sheet 14
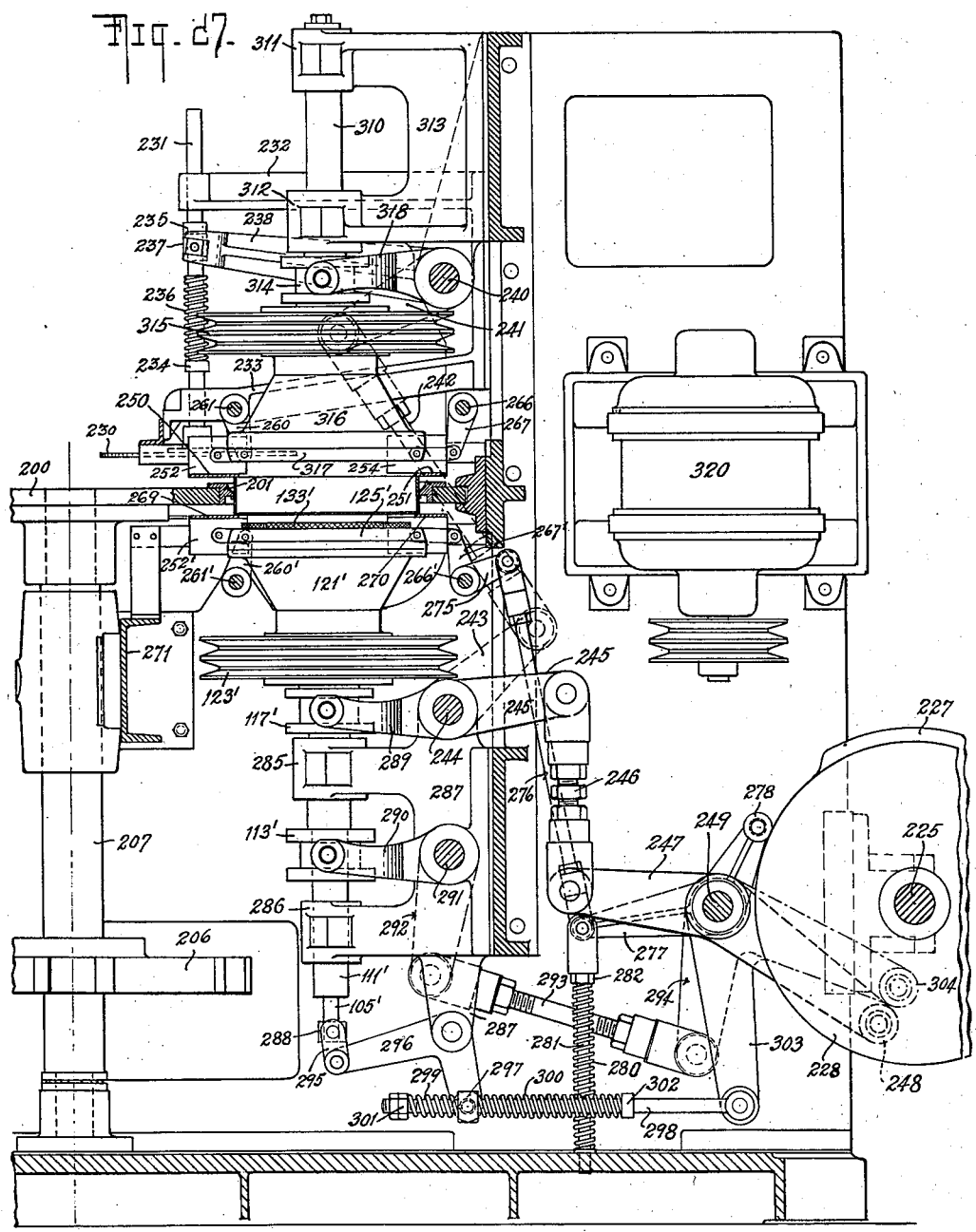
WITNESS
INVENTOR
ALBERT F. MILLER
BY
ATTORNEYS

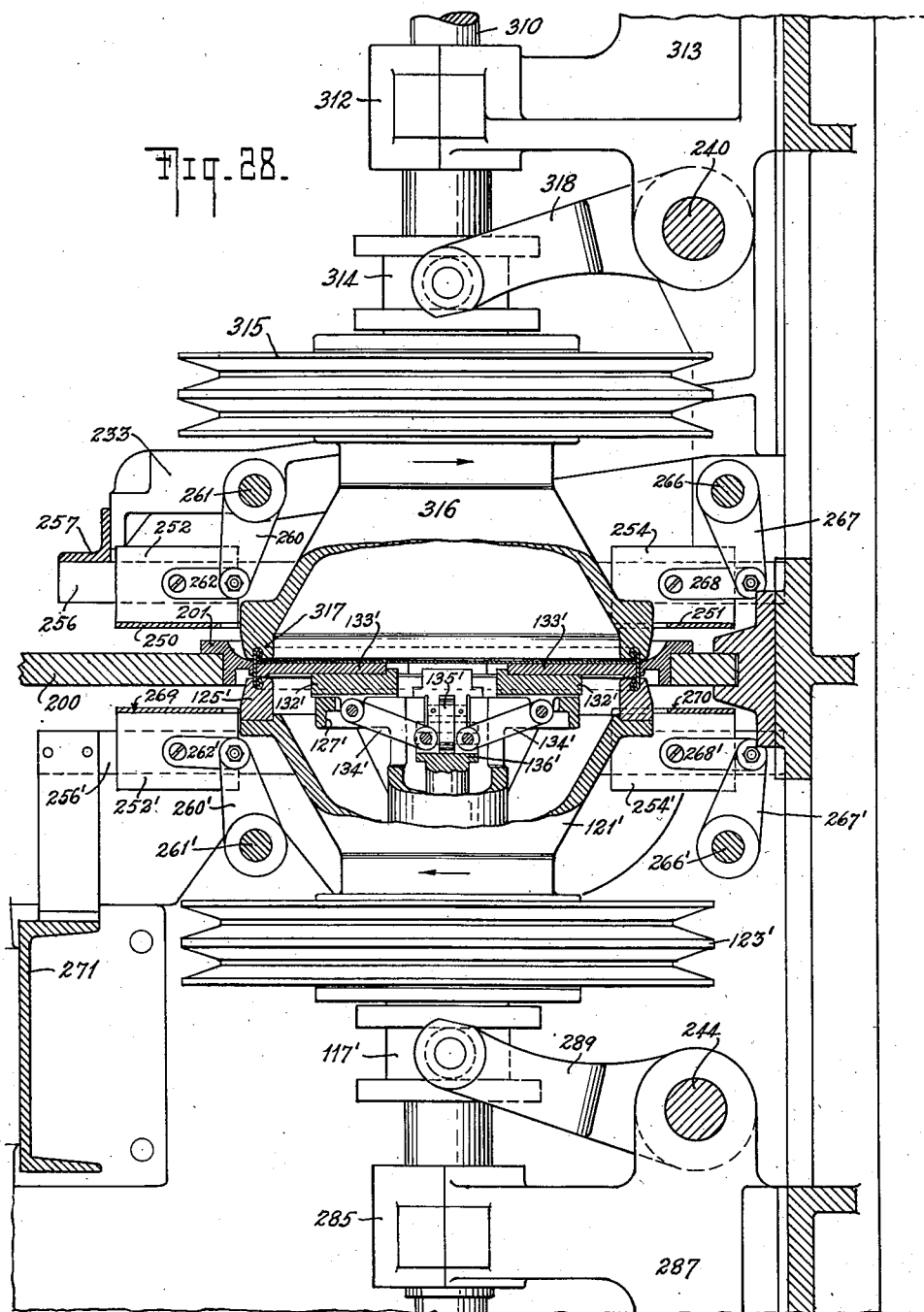

Patented Mar. 24, 1942

2,277,128

UNITED STATES PATENT OFFICE 2,277,128

MACHINE FOR MAKING PAPER CONTAINERS

Albert F. Miller, New York, N. Y., assignor, by mesne assignments, to president and directors of The Manhattan Company, New York, N. Y., a corporation of New York, as trustee for Gibson Patent Containers, Ltd.

Application September 16, 1938, Serial No. 230,183

41 Claims. (Cl. 93—36.5)

This invention relates to machines for making containers and more particularly to machines for forming containers and covers from tubes composed of one or more plies of paper.

The principal object of the invention is to provide an efficient and durable automatically operating machine capable of rapidly producing containers and container covers which when assembled together form the complete containers.

Other objects and advantages of the invention will be in part obvious and in part pointed out in the following detailed description of the invention.

Before taking up a detailed description of the invention, however, it is considered advisable to point out that the invention broadly involves a rotatable turret or table which is rotated by suitable driving mechanism in a step-by-step fashion and which is provided with holders for receiving the annularly shaped blanks from which the container bodies and the covers are formed. In one embodiment of the invention, the blanks are held in position in the holders during the cycle of operations by gripping means which are actuated automatically in the operation of the machine to grip the blanks as they are successively fed to the machine and to successively release the finished articles as each successive holder completes its cycle of operations. In that embodiment of the invention which is designed to manufacture the container covers, the blanks are maintained in position in the holders by suitable guide mechanism during the step-by-step movement of the table until the blanks arrive at the station where the beading operations are performed thereon, whereupon gripping means temporarily engage the blanks to hold them in position until engaged by the beading mechanism. The advantage of this latter arrangement is that the cover discs for the covers can be fed to the machine at the same time that the annular side portions thereof are fed thereto, the guide mechanism and gripping means holding such parts in assembled relation until the beading mechanism functions to perform its operations. Means are provided in both embodiments of the invention to properly position the blanks in the holders for subsequent operations on such blanks. The beading mechanisms in both embodiments of the invention include two units disposed on opposite sides of the tables so that both ends of the blanks are operated upon simultaneously. Each of the beading units comprises a beading die and interior clamping mechanism which are movable relative to one another and are controlled by a series of cams and levers which are in turn driven from the main drive of the machine. The rotational movement of each die, however, is imparted by a separate continuously driven motor. After the beading operations automatic ejecting means operate either to loosen the blanks in the holders or to discharge them from the holders into a waxing device.

The invention consists accordingly in the novel features of construction, arrangements and combinations of parts embodied by way of example in the machines hereinafter described and illustrated in the accompanying drawings in which Figs. 1–20 illustrate one form of the invention, Figs. 24–28 illustrate another form of the invention and Figs. 21–23 illustrate the products which are produced by such forms of the invention. It is to be noted that the embodiment of my invention illustrated in Figs. 1–20 is particularly adapted for forming the container bodies illustrated in Figs. 21 and 23 while the embodiment illustrated in Figs. 24–28 is particularly adapted to form the covers for the container bodies produced by the first-mentioned embodiment of the invention, an illustration of such covers being shown in Fig. 22.

Figure 2:
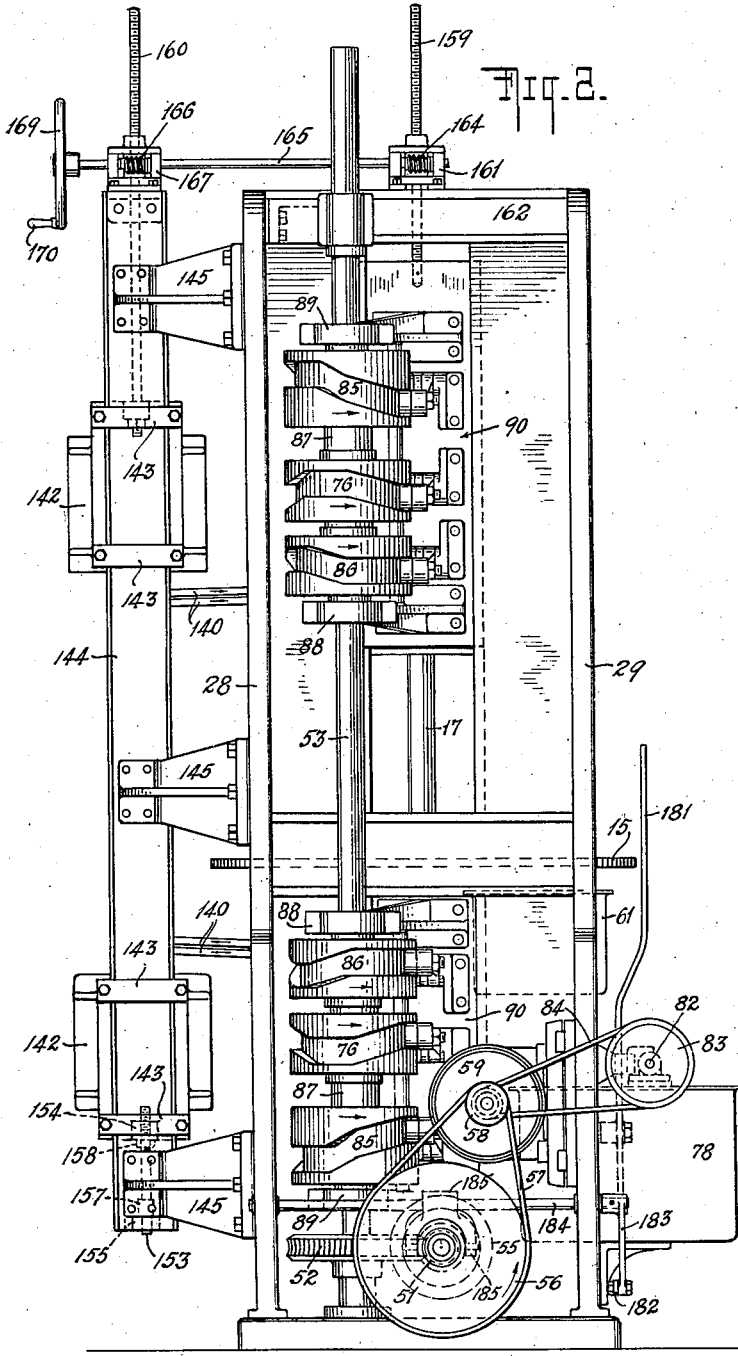
Figure 3:
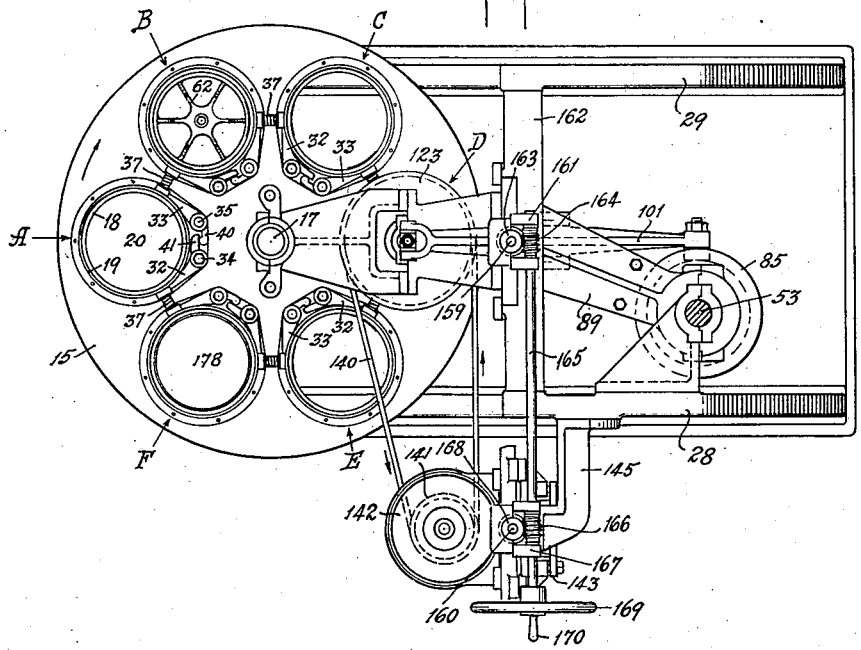
Figure 4:
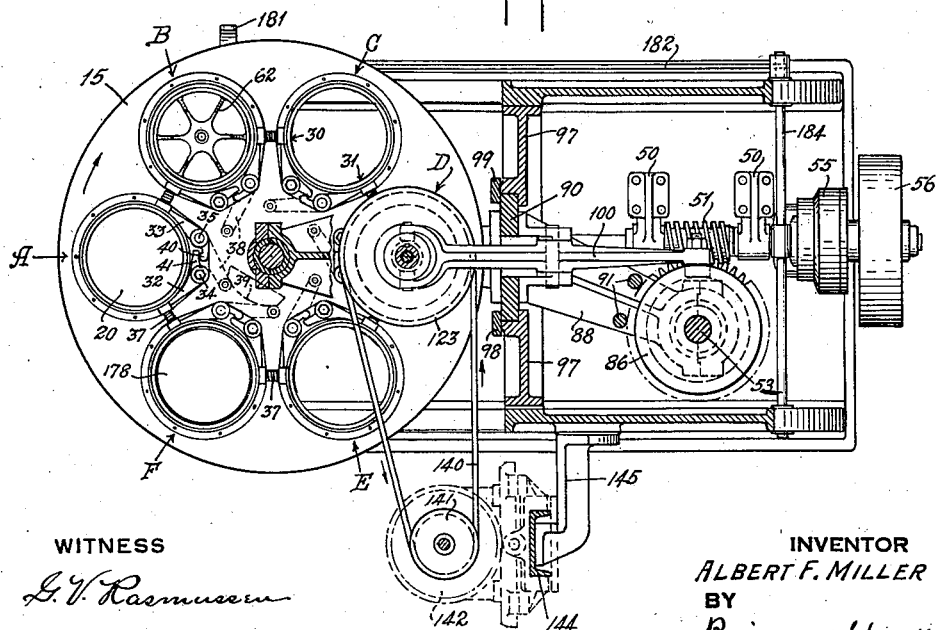

Referring more particularly to the drawings, in which the same reference characters indicate the same parts in the various views, Fig. 1 is a side elevation of the container machine, the parts being shown in a normal or at rest position and certain of such parts being shown in dotted outline; Fig. 2 is a rear elevation of the mechanism shown in Fig. 1; Fig. 3 is a top plan view of the machine, certain of the parts being omitted for the sake of clearness; Fig. 4 is a sectional plan view of the machine taken along the line 4—4 of Fig. 1; Fig. 5 is a sectional plan view of the machine taken along the line 5—5 of Fig. 1; Fig. 6 is a sectional plan view of the machine taken along the line 6—6 of Fig. 1; Fig. 7 is a top plan view of the lower spinner and spinner operating mechanism; Fig. 8 is a side elevation, partly in section, of the mechanism shown in plan view in Fig. 7; Fig. 9 is an enlarged sectional view of the spinner mechanism, the section being taken along the line 9—9 of Fig. 8; Fig. 10 is a side elevation of the clamping mechanism shown in section in Fig. 9; Fig. 11 is a top plan view of the spinner and clamping head, the clamp slides and guides being shown in dotted outline; Fig. 12 is a detail plan view of the guides in which the clamp slides move; Fig. 13 is a vertical section, partly in outline, of the upper and lower spinner and clamping mechanism shown in connection with a container body, the relation of the parts being illustrated at the moment that the beading operations are finished and the mechanism is ready to be withdrawn to its normal position; Fig. 14 is a bottom plan view of the upper spinner mechanism, the clamps being shown in their operated position; Fig. 15 is an enlarged sectional detail of the beading groove of the upper spinner; Fig. 16 is an enlarged sectional view of the beading groove of the lower spinner; Fig. 17 is a plan view, partly in section, of a portion of the turret illustrating the construction of the container holders and the arrangement of the outer body clamping mechanism, certain of the parts being omitted for the sake of clearness; Fig. 18 is a sectional view taken along the line 18—18 of Fig. 17; Fig. 19 is an elevation, partly in section, of the waxing device and the operating mechanism therefor and Fig. 20 is a similar view of the mechanism for discharging or loosening the container bodies in the holders at the end of the sequence of operations; Fig. 21 is a perspective view, partly in section, of the container body produced by the embodiment of the invention illustrated in Figs. 1–20; Fig. 22 is a similar view of the cover of such container; Fig. 23 is a sectional view showing the container and cover in assembled relation, the body of such container being much shorter than the container body illustrated in Fig. 21 to illustrate the adaptability of the machine for making container bodies of varying sizes; Fig. 24 is a side elevation of a machine made in accordance with the invention and modified to make container covers, certain of the parts thereof being shown in dotted outline; Fig. 25 is a top plan view of the machine shown in Fig. 24; Fig. 26 is a sectional view of the machine taken along the line 26—26 of Fig. 24; Fig. 27 is a side elevation of the spinning mechanism incorporated in this form of the invention and certain of the operating parts therefor; and Fig. 28 is an enlarged detailed side elevation, partly in section, of a portion of the mechanism shown in Fig. 27, certain of the parts being broken away and in section for the purposes of illustration.

In order to facilitate an understanding of the invention, general reference will first be given to the construction of the articles which are the products of the full operation of both the form of the machine illustrated for making container bodies and the form of the machine as modified for the manufacture of covers for such container bodies. These articles are illustrated in Figs 21–23 of the drawings, the body of the container which is made in that embodiment of the invention shown in Figs. 1–20, being illustrated in Figs. 21 and 23 and comprising a multi-ply paper wall of circular cross-section, the inner ply or lining 1 thereof being preferably formed from a sheet of white paper and the outer ply 2 thereof being preferably formed of a heavy brown paper. Prior to being fed to the machine which is the subject of the present invention the two plies 1 and 2 were formed together into the shape of a tube and the tube then cut up into cylindrical blanks of the desired size. As a result of the operations performed on the cylindrical body blank the lower edge of the multi-ply body is rolled inwardly to form an inturned bead 3, the upper surface of which has been somewhat flattened, as indicated at 4, to provide a shoulder of sufficient width to support satisfactorily the disc-shaped bottom 5 which merely rests on such shoulder 4 and is not fixedly attached to the body of the container (see Fig. 23). The lower edge portion of the container has been treated with paraffin prior to the formation of the bead 3 so that the paper material which forms such bead and the lower portion of the container wall around such bead, as indicated by the numeral 6, is thoroughly impregnated with the wax. The disc bottom 5 may also be impregnated with wax in a separate operation. The upper edge of the container body is rolled outwardly to provide a wide, tightly formed bead 7, the upper edge portion of the container body being disposed substantially vertically within the bead and in close engagement with the outer surface of the body and the adjacent curled portion of the container wall. The bead 7 not only serves to strengthen the upper portion of the container body but interlocks with the cover of the container to hold the latter firmly in position thereon as is shown in Fig. 23.

The cover of the container is illustrated in Figs. 22 and 23 of the drawings and is composed of a heavy single ply paper which like the material of which the body is composed, has first been formed into the shape of a tube and then cut to an appropriate width before feeding it to the machine shown in Figs. 24 to 28 of the drawings. As a result of the operations performed upon such annular blank, the upper and lower edges of the cover which is designated by the numeral 8, are provided with two inturned beads 9 and 10, respectively. Disposed within the annular cover member 8 and intermediate the beaded edges 9 and 10 is positioned a loosely mounted cover disc 11 which has a diameter substantially the same as the outside diameter of the upper bead 7 on the container body so that it rests thereon when the cover is placed in position on the body of the container. In the assembled condition of the parts the annular cover member 8 and the cover disc 11 are locked in position on the container body by the interlocking engagement of the lower bead 10 of the cover with the upper bead 7 of the container body. As the cover disc 11 is not secured to any of the parts of the container the product packed in the container can be removed or dispensed therefrom by simply prying out the cover disc, the annular cover member 8 remaining in locked position on the upper portion of the container body and serving to give it rigidity.

*Container body machine*

Considering now that form of the machine which was particularly designed to make the container illustrated in Fig. 23 and which is illustrated in Figs. 1 to 20 of the drawings, the partly made container bodies in cylindrical form are fed to a rotating turret including a table 15 which is fixedly secured, as by bolts, upon a centrally disposed hub 16, the latter of which is mounted upon and fixedly attached to a vertically disposed shaft 17, as is shown more clearly in Fig. 18. The shaft 17 is rotated in a step-by-step fashion by mechanism hereinafter described. The table 15 is provided with six holders or receptacles for receiving the container bodies and during its step-by-step rotative movement in a clockwise manner, as viewed in Fig. 17, brings the holders to a stop at a number of stations where a series of operations are performed. In Fig. 3 of the drawings, these several stations are indicated by letters, the letter A indicating the position in the travel of the table 15 at which the partly formed cylindrical container blank is inserted by the operator in one of the holders provided on the table. At station B a waxing device moves into engagement with the lower end of the container blank and applies a small amount of heated paraffin to such edge. In the next successive movement of the table 15 the holder at station B is carried to the position indicated by the letter C in Fig. 3 where no operation is performed upon the container blank. Upon the next rotative movement of the table the container blank is brought to the position indicated by the letter D between two spinning devices which simultaneously bead the top and bottom edges of the container. Upon the completion of this operation the table moves to the position indicated by the letter E which like the position indicated by the letter C is a blank or idle station. On termination of the period of rest at station E, the next rotative movement of the table brings the container blank to the position F where discharge mechanism engages with the bottom of the container and loosens it sufficiently to enable the operator to readily remove it therefrom. The next rotative movement of the table completes its cycle and brings the holder to position A where a new container blank is inserted therein.

Holders and stop plate

The container blank holders or receptacles each comprise a cylindrically shaped body portion 18 supported in position over an opening provided in the table 15 by means of an outwardly extending flange integral with the lower end of such cylindrical portion 18 and fixedly secured to the table 15, as by bolts (see Figs. 17 and 18). The upper end of the cylindrical portion 18 is provided with an outwardly flaring funnel shaped portion 19 which serves as a guide to enable the operator to load the holder readily. When the operator inserts the body blank in the holder 18 he forces it down into the holder until the lower end thereof engages with a stop plate 20 (see Fig. 18) which is disposed a predetermined distance below the table at the loading station A. The stop plate 20 is mounted on a vertically disposed shaft 21, which extends through and is supported by the hub-shaped outer end of a bracket 22. A set screw 23 is provided to fixedly secure the shaft 21 in position on the bracket 22 and to enable adjustment of the shaft 21 and therefore the plate 20 with respect to the table 15. The bracket 22 is bolted at its other end to a flat surface provided on the part 24 of a split bearing through which extends the turret shaft 17. The other half 25 of the split bearing is provided with an integrally formed plate 26 which rests upon and is bolted to the upper flange of a cross T-beam 27. The cross beam 27 is supported by the side frame members 28 and 29, as is shown more clearly in Fig. 5 of the drawings.

Gripping means

Associated with each of the container holders is a pair of arcuately shaped shoes or gripping members 30 and 31 which extend through spaced openings provided in the body of such holders, as shown in Figs. 17 and 18, and are adapted to engage with the outer surface of the container blank and hold such blank securely in position in the holder during the travel of the table 15. As can be clearly seen in Figs. 17 and 18, the shoes 30 and 31 are formed on the outer ends of the levers 32 and 33, respectively. the other ends of the levers 32 being rotatably mounted on the vertically disposed studs 34 which are fixedly secured to the lower flanges of the holders, while the levers 33 are affixed at their other ends to the upper ends of the pins or shafts 35.

The shafts 35 extend through the hub bearings 36 which are integrally formed with those portions of the holder flanges which are adjacent to the central axis of the table 15. The shoe 30 of each container holder is disposed opposite to the shoe 31 of the adjacent container holder and is connected thereto by means of a compression spring 37 whose ends are seated into hollow recesses provided in the opposed sides of such shoes and which normally tends to maintain such shoes in engagement with the outer surfaces of the containers in such holders. Means are provided, however, to simultaneously pivot the shoes 30 and 31 of a container holder out of engagement with a container disposed therein against the tension of the springs 37 to enable discharge of the finished container and permit the insertion of a new container blank in the holder. This means comprises a cam arm 38 which is disposed beneath the table 15 and which is fixedly connected to the lower end of the shaft 35 supporting the lever arm 33. The outer free end of the cam arm 38 is provided with a roller adapted to ride on the outer edge of a cam 39 disposed in horizontal relation beneath the turn table 15. The cam 39 is so positioned with respect to the cycle of movement of the table 15 and its cam surface is so formed that when a holder moves into position at the discharge station F the roller on the cam arm 38 will engage with the cam 39 and the latter will thereupon cause the cam arm 38 to be pivoted outwardly towards its associated holder 18. Outward movement of the cam arm 38 will rotate the shaft 35 and the lever arm 33 in a clockwise direction, as viewed in Fig. 17, against the tension of the spring 37 associated with such lever arm to withdraw the shoe 31 from engagement with the container in the holder. The lever arm 33 has integrally formed therewith an extension 40 which extends oppositely from the shaft 35 so as to form an obtuse angle with the arm 33 and which is provided with an offset rounded edge adapted to engage under the tension of spring 37 with a flat surface provided on the outer end of an extension 41 integrally formed with the lever arm 32 and disposed intermediate the extension 40 and the container holder 18. It will be evident from Fig. 17 of the drawings that as lever arm 33 is pivoted outwardly by the coaction of the cam arm 38 and cam 39, the extension 40 associated therewith will be pivoted towards the holder 18 and will press the extension 41 in the same direction thereby causing the lever arm 32 to be rocked outwardly to withdraw the shoe 30 from engagement with the container in such holder whereby such container may be readily removed from the holder. The roller of the cam arm 38 of each holder will remain in engagement with the cam 39 throughout the range of movement of such holder from station F to station A, as is clearly shown in Fig. 17, so that the shoes 30 and 31 are maintained in retracted position by such cam during the loading of a container. When a loaded holder moves from station A to station B on the next step-by-step movement of the table 15 the cam roller 38 of such holder will move off the cam surface of the cam 39 thereby enabling the springs 37 connected with the shoes 30 and 31 of such holder to move the shoes into engagement with the container body and such springs will maintain this engagement of the shoes until the holder again comes around to the discharge station F whereupon the above described operations will be repeated. The disengaging of the shoes 30 and 31 of one or two of the holders will not affect the gripping action of the shoes of the other holders except to assure such gripping action due to the interconnection of all the lever arms, springs and extensions. The inward movement of the shoe is limited by the holder which functions as a stop to limit the pivotal movement of the lever arms 32 and 33 under the tension of the springs 37 as is more clearly shown in Fig. 17. The cam 39 which controls the actions of such parts, is bolted to the upper surface of a flat plate forming part of a bracket 42 which is integral with the bracket 22 supporting the stop plate 20, as is shown in Fig. 18.

Driving mechanism

The step-by-step rotation of the table 15 is accomplished by means of a Geneva wheel 43 secured to the lower end of the vertical shaft 17 and having inwardly extending circumferentially spaced notches (see Fig. 6) adapted to be engaged by a driver or actuating arm 44, the wheel 43 and arm 44 comprising the members of the well known Geneva movement. The arm 44 is keyed to a vertical shaft 45 upon which is also mounted a worm wheel 46. Engaging with the worm wheel 46 is a worm 47 which is fixed to the horizontally extending shaft 48 which extends through the bearing of a bearing bracket 49 by which one end of such shaft is supported. The other end of the shaft 48 is supported by a pair of spaced bearing brackets 50 intermediate which is disposed a worm 51 which is likewise secured to the shaft 48 and engages with a worm wheel 52 mounted on the lower end of a vertically extending cam shaft 53 to which is secured the cams for actuating the several mechanisms distributed around the table as will be hereinafter explained. A pulley wheel 56 is mounted on the other or right-hand end of shaft 48, as viewed in Fig. 6 and is connected in driving relation to such shaft by means of a clutch mechanism 55 of a well known type, the particular mechanism used being known as the "Dodge" clutch. The pulley wheel 56 is driven in the direction of the arrow shown in Fig. 6 by a compound belt 57 consisting of a plurality of V-shaped belts which are connected at their other ends to a compound pulley 58 having V-shaped grooves and mounted on the shaft of a motor 59. It will be apparent from the foregoing that when the clutch mechanism is operatively connecting the pulley 56 to the shaft 48, the motor 59 through the connections just described will rotate the worm 47 in a counterclockwise manner, as viewed from the right of Fig. 6, to rotate the worm wheel 46 in the direction indicated thereon. The mechanism is so arranged that worm wheel 46 rotates through six revolutions for each revolution of the table 15 so that the Geneva wheel 43 and the turn table 15 are rotated through sixty degrees or one step, in the direction of the arrow indicated on wheel 43 in Fig. 6, for every revolution of the worm wheel 46.

Waxing means

On the first sixty degree movement of the table 15, the holder which has had a body blank inserted therein at the station A comes to rest at the position indicated by the letter B in Fig. 3 of the drawings, to position the container body held therein by the shoes 30 and 31 above a wax applying device 60 which normally is disposed below the surface of the paraffin in the tank 61 (see Fig. 19). The wax applying device 60 is an annularly shaped rim member integral with a spider 62 secured to the upper end of a vertically disposed shaft 63 which extends through the hub of such spider. The vertical shaft 63 also extends through an open pipe 64 connected in sealed relation at its lower end to the bottom of the tank 61 and projecting up above the upper surface of the bath to prevent wax from entering therein. The portion of the shaft 63 which projects below the tank 61 extends through a pair of spaced guide members 65 formed on the outer end of a bracket 66 which is bolted at its other end to the under side of the cross T-beam 27. Secured to the shaft 63 intermediate the spaced guide members 65 is a connection 67 provided with a transversely extending pin to which is connected one end of a link 68, the other end of which is connected to one end of a rocking beam 69 pivotally supported on a stud integral with the bracket 66. The other end of the beam 69 is connected by a link 70 to one end of a rocking beam 71 pivotally supported intermediate its ends by the bracket 72 which is fixedly secured to the cross T-beam 27. The rocking beam 71 is connected at its other end by a link 73 to one of the forked arms provided on the forward end of a cam lever 74. As will be more clearly seen in Fig. 8, the cam lever 74 is pivotally supported intermediate its ends on a bearing shaft mounted between a pair of spaced brackets 75 and is provided at its other or rear end with a cam roller adapted to ride in the horizontally disposed cam groove of the cylinder cam 76. The cam 76 is secured to the vertically extending cam shaft 53 which, as has been previously described, has secured to its lower end a worm wheel 52 which engages with the worm 51 mounted on the shaft 48 (see Fig. 6).

It will be evident from the foregoing and from Figs. 6, 8 and 19 of the drawings that as the shaft 42 rotates the worm 51 in a counterclockwise direction, as viewed from the right of Fig. 6, the worm wheel 52 will be rotated in the direction indicated by the arrow thereon to rotate the shaft 53 and the cam 76 to the right, as is indicated in Fig. 8. When the cam roller is in the upper horizontal portion of the cam groove as is shown in Fig. 8, the wax applying device 60 is at rest in its lowermost position below the surface of the bath, as is shown in Fig. 19. When, however, the roller of the cam lever 74 in the rotational movement of the cam 76 rides down into the lower horizontal portion of the cam groove, the outer end of the cam lever 74 will be pivoted upwardly and through the beam and link connections above described, will lift the shaft 63 upwardly, thereby lifting the waxing element 60 up into engagement with the lower edge of a container blank disposed thereabove, as is shown in dotted outline in Fig. 19 of the drawings. The machine is so designed that the cam through the connecting parts above described will not lift the waxing element 60 upwardly into engagement with the bottom edge of the container blank until the holder 18 carrying such container blank comes to a complete stop at that station during the step-by-step movement of the turn table 15 and will maintain such engagement for almost the entire period of rest of the table. The upper surface of the waxing element 60 which comes into engagement with the bottom edge of the container, is a flat horizontal one so that as such element emerges from the bath in the tank 61 it will not carry an excess amount of wax with it. To insure that the amount of wax carried up by the waxing element 60 is a minimum, the waxing element is provided with a number of radially extending grooves 77 (see Fig. 5) which cause the wax to drain from the flat contacting surface of the element 63 during its upward movements.

The tank 61 is supported on the upper flange of the cross T-beam 27 and is disposed above a supply tank 78 (see Fig. 5) with which it is connected by means of a pipe (not shown). The wax from the supply tank 78 is pumped up by means of a pump (not shown) which is connected to and driven by the motor 59 of the machine through a vertical shaft 79 having mounted on its upper end a beveled gear 80 with which is engaged a pinion 81 mounted on one end of a horizontally extending shaft 82. Provided on the other end of the shaft 82 is a pulley wheel 83 which is connected in driven relation to the shaft of the motor 59 by means of a belt 84. An overflow pipe is provided in the tank 61 and the wax is maintained in liquid condition in the tanks 61 and 78 by means of steam pipes, one of which is indicated in Fig. 19 of the drawings.

*Beading means*

After the waxing of the lower end of the container blank is completed, the turn-table 15 rotates through sixty degrees to move the container blank and the holder carrying the same to the position indicated by the letter C in Fig. 3 of the drawings, the next succeeding holder 18 which has been provided with a container body blank at the station A during the waxing operation just described, moving into the position B for an application of wax to the bottom edge of the container held thereby. As has been previously mentioned, the position C is an idle station and no operations are performed on the container blank while it is at rest in this position of the travel of the turn-table. On the next rotational movement of the turn-table 15, the container blank is moved from position C to position D, where the top and bottom edges of the container blank will be simultaneously beaded in a manner now to be explained. The mechanism for performing this beading operation is composed of two units one of which is disposed below the level of the turn-table 15 and the other of which is disposed above the level of such table, the two units being similar in all respects except for certain details which will be pointed out. In view of the similarity of these two units and the fact that a description of one will suffice for an understanding of the arrangement and operation of both, a detailed description of the lower unit only will be given, it being understood that such description applies in all respects to the upper unit, the parts of which have been given reference characters similar to those designating similar parts in the lower unit. It may first be stated generally that each unit which is adjustably mounted on the rear portion of the machine or to the right as viewed in Fig. 1 includes a beading head driven by an independent motor and adapted to curl one end of the container into the proper configuration. Contained within the beading head are clamping mechanisms adapted to engage with the interior surfaces of the container and prevent rotational movement of the latter during the beading operation.

*Beader operating means*

The operations of the beading and clamping mechanisms of each unit are controlled by three sets of cylindrical cams and cam levers (see Fig. 8 of the drawings), the upper set of which controls the movements of the beader, the center set of which controls the movements of the head containing the clamping mechanism and the lower set of which controls the actuation of the clamping mechanism carried by such head. The three cams are so designed that a proper sequence in the movements of the beader, clamping head and clamping mechanism are obtained. Referring now to Figs. 2 and 8 of the drawings, the three cams 85, 76 and 86 of each unit, are fixedly secured to a sleeve 87 which surrounds and is keyed in driving relation to the vertical cam shaft 53 but may be moved longitudinally to the latter for the purposes of adjustment. The sleeve 87 is supported by a pair of spaced brackets 88 and 89 which are bolted at their forward ends to a slide plate 90 (see Figs. 2 and 8) and are maintained in spaced rigid relationship by means of the vertically disposed tie-rods 91 (see Fig. 8. The outer free ends of the upper bracket 88 and the lower bracket 89 are annularly formed and have securely attached to the interior surfaces thereof the outer races of a pair of ball bearing units 92 and 93, respectively, the inner races of which are seated on the reduced end portions of the sleeve 87. A pair of lock nuts 94 and 95 which threadedly engage the threaded upper and lower ends, respectively, of the sleeve 87, secure the inner races of the ball bearing nuts 92 and 93 in position on such sleeve. It will thus be seen that the sleeve 87 and consequently the cams 85, 76 and 86 mounted thereon may be shifted as a unit with respect to the cam shaft 53 but are supported with relation to the latter so as to be rotatable therewith. The slide plate 90 which supports the brackets 88 and 89 and therefore the sleeve 87 and cams 85, 76 and 86, has its vertically disposed side edges positioned within guideways formed by the inner opposed edges of the spaced vertical frame members 96 and 97 and the cover plates 98 and 99, respectively, such plate being movable within such guideways to provide for adjustments.

The slide plate 90 is provided with three longitudinally spaced openings through which extend the spaced vertically arranged cam levers 74, 100 and 101. The top and bottom cam levers 100 and 101, like the aforementioned cam lever 74, are pivotally supported intermediate their ends on two pairs of spaced vertically disposed brackets 102 and 103, respectively, which like the brackets 75 upon which cam lever 74 is pivotally mounted, are fixedly secured by bolts to the rear face of the plate 90 in position to enable free rocking movement of such cam levers within the openings of such plate throughout their range of movement under the influence of the cams 85, 76 and 86. Each of the cam levers 100 and 101, like cam lever 74, is provided at its rear end with a cam roller which engages in the cam groove of its associated cylindrical cam, the cam lever 100 being controlled in its movements by the cam 86 and the cam lever 101 being connected to the cam 85, while as has been previously described, the cam lever 74 is in operative engagement with the cam 76. Also like the cam lever 74, the cam levers 100 and 101 are provided with forward forked ends, the forward forked end of cam 101 pivotally supporting a pair of spaced depending links 104 which are disposed on each side of the actuating shaft 105 of the clamping mechanism (see Fig. 9) and are attached at their lower ends to a collar 106 which is slidably mounted on the shaft 105.

Downward movement of the collar 106 on the shaft 105 is limited by a nut 107 which is in threaded engagement with the lower end of such shaft and is locked in position thereon by a lock nut 108. The upper end of the collar 106 serves as a seat for one end of a coiled spring 109 which is seated at its upper end against a collar 110 fixedly secured to the shaft 105 by means of a pin.

It will thus be seen that when the forward forked end of the cam lever 101 is pivoted upwardly by the cam 85, the collar 106 will be lifted upwardly and through the spring 109 and collar 110 will lift the shaft 105. The compression exerted on the spring 109 by means of the collar 106 and nut 107 is such that the weight of the shaft 105 and the mechanism associated therewith is counterbalanced so that such spring in effect functions as a rigid member at this period of the movement of the cam lever 101 to lift the shaft 105 almost immediately.

Beader device

The shaft 105 extends through a hollow shaft 111 which is supported on the forked end of the cam lever 74 by means of a pair of inwardly extending rollers 112 which are rotatably mounted on the arms of such fork and which engage in an annular recess provided in the outer surface of a cylindrical collar 113 which is secured in threaded engagement to the hollow shaft 111. The movement of the shaft 111 under the influence of cam lever 74 is confined to a vertical direction by means of a pair of vertically spaced bearing brackets 114 and 115 through the outer bearing ends of which the shaft 111 extends and which are bolted at their other ends to the front face of the plate 90 as is shown more clearly in Fig. 8. Extending longitudinally of the hollow shaft 111 and projecting outwardly from the surface thereof is an elongated key 116 (see Fig. 9) which engages with a keyway provided in the bearing formed on the bearing bracket 114 to prevent rotational movement of such shaft. The key 116 is sufficiently long to enable it not only to be in engagement with the keyway of the bracket 114 throughout the range of movement of the shaft 111 but also to maintain its engagement with a keyway provided on the interior surface of a sleeve 117 mounted on the upper end portion of the shaft 111 above the bearing bracket 114.

The sleeve 117 is connected to the forked end of the upper cam lever 100 by a roller and recess connection similar to that connecting cam lever 74 and collar 113 (see Fig. 9), such cam lever 100 raising and lowering the sleeve 117 with respect to the shafts 105 and 111 under the influence of the cam 86 (see Fig. 8). As is shown more clearly in Fig. 9 of the drawings, the sleeve member 117 is provided adjacent its upper end with a race seat on which is disposed the inner race of a ball bearing unit 118, such inner race being secured in position by means of a lock nut 119 which threadedly engages with the upper end portion of the sleeve member 117. The outer race of the bearing unit 118 is secured to the annular flanged base 120 of a frusto-conically shaped housing member 121 by means of an annular plate member 122 and the rim of a pulley 123 which surrounds such outer race, said parts being secured in assembled relation to the annular flanged base 120 of the housing member 121 by means of the bolts 124 which extend through the plate member 122, the rim of pulley 123 and into the base 120. By this construction the housing member 121 and the pulley 123 are revolvably carried by the sleeve member 117. The upper part of the housing 121 is provided with an outwardly extending flange on which is seated the spinning die 125, the latter of which is secured in position on such flange by means of bolts.

It will be evident from the foregoing that the shaft 105, the shaft 111 and the sleeve 117 of the beading unit are independently operable from the cam levers 101, 74 and 100, respectively, and are so arranged as to permit of movement relative to each other, the shaft 105 extending through and being movable relative to shaft 111 and sleeve 117 which surrounds the upper end portion of shaft 111 and revolvably supports the pulley 123 and the spinning die 125, being movable relative to the shafts 105 and 111. It will also be seen that the shaft 111 and the sleeve 117 are confined to a vertical movement only by means of the bearing brackets 114 and 115 and the key and keyway connections with the bearing bracket 114. Bushings 126 are provided at each end of the shaft 111 to guide the movements of shaft 105.

The cams controlling the movements of the above mentioned parts are so designed that during the first quarter revolution of the cam shaft 53 from the position indicated in Fig. 8 no movement is imparted to any of these members. During the next forty-five degree rotation of the shaft 53 cam levers 74 and 101 are actuated to lift shafts 105 and 111 simultaneously, cam lever 100 and sleeve 117 being maintained in stationary position by the cam 86. In the next forty-five degree travel of the cams the upward movement of shaft 111 is discontinued while the cam 85 continues the upward movement of shaft 105, which upward movement stops just before the collar 110 on shaft 105 would engage with the lower end of shaft 111. During this forty-five degree travel of the shaft 53, the cam 86 also causes the cam lever 100 to lift the sleeve 117 upwardly although at a slower rate of rise than that of the shaft 105. In this position of the parts the cams and shaft 53 have completed one-half a revolution. During the next forty-five degree travel of the cams, the shafts 105 and 111 are maintained at rest in their uppermost positions while the sleeve 117 continues its upward movement. Upon continued rotation of the cams the sleeve 117 is first moved downwardly to its lowermost position, then the shaft 105 is moved downwardly followed by the shaft 111 whereupon both shafts together continue their downward movement to their lowermost or retracted positions.

The upward movement of the shaft 111 brings into operative relation with the bottom end of the container blank mechanism for clamping the latter in position during the beading operation and which includes a horizontally disposed annular support 127 having integrally formed therewith a central hub portion 128 which is fixedly secured to the upper end of the shaft 111. The support 127 is provided with two sets of diametrically opposed apertures 129 and 130 arranged about and in communication with the central opening of such support, said apertures being also in communication with four vertically disposed slots provided in the upper end of the hub portion 128 of such support. Mounted on the upper surface of the support 127 along the side edges of the apertures 129 and 130 are guide members 131 (see Fig. 12), the guide members of each aperture being adapted to receive a sliding block 132 having mounted on its upper surface a clamp member 133 (see Fig. 9). It will be observed from Fig. 11 of the drawings that the clamping members 133 mounted on the sliding blocks 132 which are disposed in opposed relation over the two sets of openings 129 and 130, are designed to form four segments of a circle, the outer arcuate edges of which are adapted to engage with the interior surfaces of the container blank when the sliding blocks 132 are moved outwardly from the central opening of the support 127.

Movement is imparted to the sliding blocks 132 and clamping members 133 by means of two sets of toggle links 134 and 135, each of the four links being pivotally connected at their upper ends to the undersides of the sliding blocks 132 and at their lower ends to a link head 136, the links 134 being arranged for movement in the apertures 130 and the links 135 being arranged for movement in the apertures 129. The link head 136 is connected to the upper end of the shaft 105 which extends into the hub portion 128 of the support 127 and is composed of a square block which has been slotted to provide four upstanding spaced supports 137 between each two of which is disposed the lower end of one of the toggle links, the toggle links 134 being pivotally mounted on two short pins 138 extending through aligned openings in the supports 137, while the toggle links 135 are pivotally mounted on the pins 139 which extend through aligned openings extending transversely to those in which the pins 138 are mounted. The openings for the pins 139 intersect the openings for the pins 138 adjacent the ends of the pins 138 so that the latter are locked in position in the link head 136 by the pins 139.

From the foregoing description it will be understood that while the shaft 105 and the shaft 111 are moving upwardly in unison under the action of the cams 85 and 76, respectively, from the positions illustrated in Fig. 9, the positions of the support 127 and the link head 136 relative to each other will remain unchanged so that no movement will be imparted to the links 134 and 135, the sliding blocks 132 and the clamping members 133, the latter being retained in their retracted positions as is illustrated in Fig. 9. When, however, the upward movement of the shaft 111 has terminated and the shaft 105 continues its upward movement, the link head 136 will be advanced vertically to cause the sets of links 134 and 135 to spread and force their associated sliding blocks 132 outwardly to bring the clamping segments 133 into engagement with the interior surfaces of the container blank in the holder 18 and thereby clamp such container against the interior surfaces of the holder as is illustrated in Fig. 13. The spring 109 enables the segments 133 to engage the container blank with a cushioning effect and assures a secure holding of the blank by such segments whose outer edges are preferably knurled as is shown in Fig. 10. During the last portion of the travel of the shaft 105, the sleeve member 117 moves upwardly, as has been previously explained, carrying with it the bearing unit 118, the pulley 123, the housing 121 and the spinning die 125 upwardly until the latter engages with the bottom end of the container blank in the holder 18. The travel of the sleeve 117 is so related with the travel of the shaft 105 that when the clamps 133 engage with the interior surfaces of the container, the die 125 will be in position to start beading the bottom edge of the container blank. The beading of the bottom of the container takes place during the interval between the stopping of the upward movement of shaft 105 and the time when the sleeve 117 reaches the uppermost point in its travel, whereupon the sleeve 117 will immediately start its downward travel, as has been explained, to withdraw the die 125 out of engagement with the beaded edge of the container.

Rotative movement is imparted to each pulley wheel 123 and therefore its die 125, by means of belt 140 which is connected in driving relation to the compound pulley wheel 141 attached to the motor shaft of the continuously operating motor 142 (see Fig. 1). As the lower pulley wheel 123 is normally disposed below the pulley wheel 141, as is shown in Fig. 1, but moves to a position above the pulley 141 when the spinning die 125 is moved upwardly into engagement with the bottom edge of the container blank, it is preferable that the belt 140 and the grooves in the pulley wheel 123 and 141 be V-shaped in order to prevent displacement of the belts during such relative movement of the pulley wheels. Each motor 142 is secured by means of straps 143 to a vertically disposed channel beam 144 which is supported by three vertically spaced brackets 145 attached as by bolts to the side frame of the machine (see Fig. 2).

The spinning die 125 of both the upper and lower beading units includes an annular groove within which is disposed in annularly spaced relation, a plurality of transversely extending die members 146, as is shown more clearly in Fig. 14. In Fig. 16, which is an enlarged detailed sectional view of a portion of the die 125 of the lower unit, it will be seen that the die members 146 each consist of a cylindrically shaped piece of metal which has been ground intermediate its ends to form a die section 147 having a concave surface. Each die member 148 is contained in a circular opening 149 which extends radially of the spinning die 125 and through the annular groove 148 formed therein, such die member being positioned so that the die section 147 thereof which is as wide as the groove 148 is entirely exposed in such groove. The upper concave surfaces of such die members 148 are spaced upwardly from the bottom of the groove 148 so that the beading of the lower edge of the container blank is done entirely by such concave surfaces of the die members. The die sections 147 of the die members in the lower die 125 are so formed that in the beading of the container the lower edge of the latter is turned inwardly against the body of the container, the sector-like clamping members 133 being provided with flat arcuately shaped under surfaces 150 which are so positioned with relation to such die sections, in the clamped condition of the members 133, that at the upper end of the movement of the spinning die 125, the upper portion of the inturned bead is flattened against such under surfaces 150 of the clamping segments 133 to produce a flat upper surface on such bead, which as has already been described in connection with the article, provides a seat for the bottom disc of the container. The die members 146 are secured in position on the spinning die 125 by means of set screws 151 which extend up through the dies as is shown in Fig. 16, into engagement with the outer end portions of the die members. The die members may be adjusted for wear by loosening the set screws 151 and inserting a screw driver in the slots 152 provided in the outer end portions thereof and turning such members to provide a new beading surface.

The spinning die 125 of the upper unit is similar to that of the lower unit except that the annular groove 148 thereof is slightly narrower than that of the lower unit and the die sections 147 of the die members 146 are formed to turn the upper end of the container outwardly, as shown in Fig. 15 of the drawings, to produce the bead previously described in connection with the description of the article shown in Fig. 23 of the drawings. As the bead on the top edge of the container is flared outwardly the clamping members 133 of the upper unit cannot, of course, take part in the formation of such bead. It is also to be noted in this connection, that as the holder 18 does not extend upwardly sufficiently to surround the top portion of the container (see Fig. 13) the clamping members 133 of the upper unit do not clamp the body of the container against a firm annular surface as do the clamping members 133 of the lower unit. The body of the container, however, is sufficiently rigid to withstand the outward pressure of the clamping members 133 of the upper unit, which pressure is not sufficiently great to deform the container body.

*Beader adjusting means*

The upper and lower spinner units are adjustable with relation to each other, as has been previously mentioned, to enable the machine to work on container body blanks of widely varying heights. The mechanism for adjusting the lower unit is illustrated in Figs. 1 and 2 and includes a bolt 153 which threadedly engages at its upper end with a boss 154 provided on the motor base of the lower spinner motor 142. The lower end of the bolt 153 extends through a boss 155 integrally formed on a bracket 156 which is secured as by bolts to the channel beam 144, the bolt 153 being supported on the boss 155 by means of a collar 157 affixed thereto and seated on such boss. Adjustment of the motor base and therefore the motor 142 is attained by engaging a suitable wrench with the depressions formed in the outer surface of the collar 157 and turning the latter which causes the bolt 153 to screw or unscrew in the boss 154 thereby lowering or raising, respectively, the motor 142. A lock nut 158 is provided to maintain the motor in the position to which it has been adjusted. A similar adjusting device (not shown) may be provided also on the slide 90 of the lower unit, the upper threaded end of the bolt engaging with the lower edge portion of the slide 90 and the lower end thereof being rotatively mounted in the base of the machine.

The means for adjusting the upper spinner unit includes two threaded vertically disposed rods 159 and 160, the former of which is fixed, at its lower end, to the upper end of the slide 90 of such unit (see Fig. 2), while the threaded rod 160 is secured at its lower end to the base of the upper spinner motor 142. The rod 159 extends through a bearing unit 161 mounted on the top cross beam 162 of the machine frame and within which is provided a worm wheel 163 (see Fig. 3) which is internally threaded to engage the rod 159. The worm wheel 163 engages with a worm 164 disposed between the bearing supports of the bearing unit 161 and mounted on one end of a horizontally disposed shaft 165 which extends through such bearing supports. The shaft 165 is provided adjacent to its other end with a second worm 166 which is disposed between the bearing supports of a bearing unit 167 mounted on the upper end of the vertically disposed channel beam 144 and which engages with a worm wheel 168 similar to wheel 163 and threadedly engaging with the rod 160. The end of the shaft 165 adjacent to the worm 166 is provided with a hand wheel 169 having a handle 170 adapted to be grasped by the operator and upon rotation of such wheel, the connections just described function to move the motor 142 and the slide 90 of the upper unit simultaneously in a vertical direction thereby vertically moving as a unit the spinner and clamping mechanism and the operating cams and cam levers associated therewith to adjust the position of such upper unit relative to that of the lower unit. Prior to the adjustment of these parts, it will of course be necessary to unloosen the straps 143 which secure the spinner motors to the channel beam 144. The slide 90 is in such frictional engagement with its supporting guideways that any tendency of the slide 90 to move therein is prevented to such an extent that it is only necessary to provide a relatively small rod 156 to maintain the slide and the actuating parts mounted thereon in the position in which they are placed.

*Ejection means*

Upon the completion of the spinning operations upon the ends of the container blank the turn table 15 carries the beaded container blank to an idle or inoperative station E where such container remains during the period of rest of the turn table while the above described spinning operations are being performed on the next succeeding container. When the turn table next revolves, the beaded container blank is brought to the position F where means are provided to loosen the container in its holder 18 to enable the operator to withdraw the finished container readily from such holder. The mechanism for accomplishing this purpose comprises a link 171 which is attached to the right fork arm of the cam lever 74, as viewed in Fig. 9 of the drawings, and connects such arm with one end of a rocking beam 172 pivotally mounted on a stub shaft provided on a bracket which is secured to the cross T-beam 27. The other end of the rocking beam 172 is connected by a link 173 to a rocking beam 174 which is pivotally mounted on a stub shaft provided on a supporting bracket 175 which is secured, as by bolts, to the under side of the cross T-beam 27. The bracket 175 is provided with a pair of spaced arms having formed on their outer ends a pair of spaced vertically aligned guide members 176 through which extends a rod 177 having mounted upon its upper end a flat plate 178. The forward end of the rocking beam 174 is connected to the shaft 177 by means of a link 179 which at its lower end is pivotally connected to a collar 180 fixed to the shaft 177 intermediate the spaced guide members 176.

It will be seen from the foregoing, that when the forward end of the cam lever 74 is moved upwardly under the influence of cam 76 the vertical rod 177 will be lifted upwardly through the linkage connection above described thereby bringing the plate 178 against the lower beaded end of the container mounted in the holder disposed above such plate and upon continued upward movement of the shaft 177 the plate 178 will lift the container upwardly to loosen it from the holder 18. As the outer clamping members or shoes 30 and 31 of such holder have been retracted at this station of the turn table the operator is enabled to readily remove the container. This action takes place during the beginning of the period of rest of the turn table 15 so that the operator has sufficient time to remove the container before the table starts its next rotative movement.

General operation

From the above detailed description it is believed that the construction and the operation of this embodiment of the invention will be clearly understood and it will be seen that there has been provided a machine which will automatically wax one end of the container blank and then simultaneousluy spin the two ends thereof into the proper form. The containers, as has been previously described, are fed to the machine in the form of cylindrical blanks and are inserted into the container holders by the operator at the initial station of the turn table and forced down past the retracted clamping members or shoes 30 and 31 of such holders until the bottom ends of the container blanks engage with the stop plate 20 positioned below the turn table at such station. The rotative movement of the turn table 15 is controlled by a clutch lever 181 (see Figs. 1 and 2) which is pivotally connected intermediate its ends to the frame of the machine and connected at its lower end to one end of a horizontally disposed rod 182 which is connected at its other end to a lever arm 183. Connected to the lever arm 183 and rotatably supported by the side frames of the machine is a transversely extending rod 184 from which depends a forked member 185 for operating the clutch mechanism 55 which, as has been previously described, is of a well known type. The feed of the cylindrically shaped body blanks as well as all the operations of the machine take place during the periods of rest in the step-by-step movement of the turn table. When the filled container holders move from the loading station to the next or waxing station the outer clamping members are released from their retracted positions and under the influence of springs move into engagement with the exterior surfaces of the body blanks to clamp such blanks securely in position in the holders. The grip of the outer clamping members on the container blanks is maintained until the series of operations performed on the container blanks has been completed and the holders arrive at the last or discharge station. When the holders come to rest at the waxing station a waxing device moves upwardly into engagement with the bottom end of the container in the manner above described, and sufficient wax is absorbed therefrom by the bottom end of the container to impregnate it to the extent by which it will be curled at the spinning station. Following the waxing operation, the container blank is advanced by the turn table to the spinning station between the upper and lower spinning units which are then moved into engagement with the upper and lower edges of the container, the clamps of such spinners first engaging with the interior surfaces of the container as has been described and then the die units thereof continuing uninterruptedly to spin the edges of the container. It will be noted from Fig. 1 of the drawings that the spinner units are rotated in opposite directions so that no rotative movement is imparted to the container body itself by reason of the spinning operation. After the upper and lower edges of the container bodies have been beaded in the manner illustrated in Fig. 23 of the drawings, they are carried by the turn table to the discharge station where the outer clamping members are first retracted and then the ejector plate comes up into engagement with the bottom beaded edges thereof and by an upward movement loosens such containers in their holders so that the operator may remove the finished containers readily during the period of dwell of the holder at this station.

Container cover machine

Turning now to a description of the construction and operation of the second embodiment of my invention illustrated in Figs. 24-28 of the drawings, such embodiment is designed to operate on relatively narrow cylindrical blanks to form the covers for the container bodies made by the above described body forming machine. In such second form of my invention there is also provided a rotatable turret or table which is operated in a step-by-step fashion to bring the cylindrical cover blanks to a number of successive stations arranged around the table. The positions at which the table stops during its step-by-step movements are indicated by letters in Fig. 25 of the drawings, the letter G designating the station at which the cylindrical cover blanks and the cover discs are fed to the machine; the letter H indicating an idle station where no operation is performed on the cover blanks; the letter I designating the station where a tamper device engages with the upper edges of the cover blanks to properly position them in the holders of the table; the latter J designating the station at which the beading operations are performed on the cover blanks; the letter K indicating the station at which discharge mechanism functions to strip the beaded cover blanks from the holders and the letter L designating the station at which the stripped covers are discharged into a device adapted to impregnate the beaded cylindrical portion of the cover with a waxy material such as paraffin.

Cover holders and stop plate

As in the case of the first embodiment the rotating table which is designated by the numeral 200, is provided with six annularly spaced apertures having annularly shaped blank holders 201. As can be seem more clearly in Fig. 28 of the drawings, the holders 201 each comprise an upper outwardly extending flange adapted to rest on the top surface of the table 200 and an inwardly extending portion, positioned between the top and bottom surfaces of the table and having an internal diameter substantially the same as the exterior diameter of the cover blank with which it engages, the upper surface of such portion being preferably inclined or curved to guide the cover blank into position in such portion during the loading operation.

A horizontally disposed stationary stop or guide member is positioned a predetermined distance beneath the table 200, such stop member being substantially U-shaped and comprising the leg plates 202 and 202' and the cross plate 205 which is secured at its side edges to such leg plates. As is shown more clearly in Fig. 25, the stop member is adapted to extend across all the apertures of the table during their cycle of movement except at the station designated J which is positioned intermediate the legs 202 and 202' of such member to enable the lower beading unit to come up into engagement with the cover blank as will be hereinafter explained. The plate 202 is provided with an aperture at the station designated L to enable the beaded cover blank to be discharged into the waxing device. Adjustability of the stop member is accomplished by mounting it on the frame of the machine by means of a plurality of depending bolts 203 which are affixed to or integrally formed with such plate and extend into vertical apertures in the frame of the machine, such bolts being in threaded engagement with adjustable nuts 204 which are seated on the top surfaces of the frame. It will be noted from Figs. 24 and 25 of the drawings, that the plate 202 is positioned slightly below the plate 202' and that the plate 205 whose edge abuts the edge of plate 202' rests on top of the abutting edge portion of the plate 202 so that between station G and the discharge station L a definite shoulder is presented transverse to the path of movement of the blank holders. When an annular cover blank is inserted in a holder positioned at the loading station and above the plate 205 of the stop member, the operator pushes it down in such holder towards the latter. After a blank has been inserted in a holder at the station G and while the table is still at rest, the operator inserts within the annular blank a cover disc such as the disc 11 illustrated in Fig. 22 of the drawings. On the next step-by-step movement of the table the loaded blank and disc are moved off the plate 205 of the stop member and onto the plate 202' thereof to the position designated H which, as has been previously pointed out, is an idle station.

Driving mechanism

The step-by-step rotation of the table 200, like that of the table 15 of the first embodiment, is accomplished by means of the well known Geneva mechanism comprising a Geneva wheel 206 mounted on the vertical shaft 207 supporting the table and engaged by a driver or actuating arm 208 affixed to a shaft 209. Rotational movement is imparted to the shaft 209 through a worm wheel 210 which is mounted thereon and which engages with a worm 211 affixed to the horizontally disposed drive shaft 212 (see Figs. 24 and 26), the latter being driven from the motor 213 through the pulley wheel 214 mounted on the motor shaft, the compound belt 215, and pulley wheel 216 which is rotatably mounted on the shaft 212 and operatively connected thereto by the clutch mechanism 217. The clutch 217 is operated from the clutch lever 218 through the horizontally disposed shaft 219, lever arm 220, link 221 and the pivoted yoke-shaped lever arm 222, as is illustrated in Figs. 24 and 26. The drive shaft 212 like the drive shaft 48 of the first embodiment is provided with a second worm 223 which engages with a worm wheel 224 to drive a cam shaft 225. Unlike the first embodiment, however, in which the several mechanisms at the various stations are actuated by two sets of three cylindrical cams each, the cover forming mechanisms of this embodiment are operated through three internal cams 226, 227 and 228 which are affixed in spaced relation to the horizontally disposed cam shaft 225. The manner in which the cams are connected to their associated cover forming mechanisms will be taken up in detail in the following descriptions of such devices.

Tamping mechanism

When the holder which has come to rest at the idle station H moves on the next rotative movement of the table 200 to the station designated I, the cover blank is brought into position below a tamping mechanism which operates to force the lower edge of such blank squarely against the upper surface of the plate 202' disposed below the table. The tamping mechanism (see Figs. 25 and 27) includes a tamping plate 230 affixed to the lower end of a vertically disposed rod 231 which is arranged for vertical movement in the aligned guideways provided on the outer ends of the vertically spaced brackets 232 and 233 bolted to the cross frame of the machine. Intermediate the brackets 232 and 233, there are affixed to the rod 231 a pair of spaced collars 234 and 235, the collar 234 serving as a seat for a coiled spring 236 interposed between such collars and the collar 235 cooperating with a collar 237 which is loosely mounted on such rod intermediate the collar 235 and the upper end of the spring 236 and with the lever arm 238 which is pivotally connected at its outer end to the collar 237, to control the vertical movements of the rod 231. It will be evident that when the lever arm 238 is pivoted downwardly to press the tamping plate 230 into engagement with the cover blank disposed therebelow, such plate and the rod 231 will move downwardly under their own weight until the plate 230 rests on the cover blank whereupon the collar 237 will engage with the upper end of the spring 236 and through the latter yieldingly press the lower edge of such blank against the upper surface of the stop plate 202' and thereby properly position the blank in its holder for the operations at station J. On the upward movement of lever arm 238, the plate 230 and rod 231 is lifted through the engagement of collar 237 with collar 235.

The lever arm 238 is mounted on a horizontal transversely extending shaft 240 which is connected to and oscillated by cam 228 through a lever arm 241 mounted on said shaft and connected by an adjustable connecting rod 242 to a lever arm 243 mounted on a horizontal transversely extending shaft 244, and a lever arm 245 affixed to shaft 244 and connected by an adjustable connecting rod 246 to one arm of a bell crank lever 247 rotatably mounted on the transverse shaft 249, the other arm of such lever being provided with a cam roller 248 which rides in the internal cam groove of the cam 228. The groove of cam 228 is constructed to maintain the lever 238 through the connections above described, in upward position during the rotative movement of the table 200 and to move such lever arm downwardly and upwardly during the period of dwell of such table to cause actuation and withdrawal of the tamping mechanism.

On the next rotative movement of the table 200 the properly positioned cover blank and the cover disc positioned therein are moved from station I to station J. In traveling to station J the cover blank will move off the U-shaped stop member, means being provided to maintain the blank and cover disc in assembled condition until the clamping mechanism at station J is enabled to function.

Cover supporting means

The means for so supporting the cover blank includes two sets of slide plates which extend across the open inner end of the stop member transversely of the machine and are positioned above and below the table 200 so that as the cover blank is moved off the stop plate 202' it moves between the sets of slide plates. The upper set of slide plates 250 and 251 are shown in plan view in Figs. 25 and 26 of the drawings and in section in Figs. 27 and 28 of the drawings, plate 250 being secured at its ends to the undersides of the spaced shoes 252 and 253 (see Fig. 25) while plate 251 is secured at its ends to the undersides of the spaced shoes 254 and 255. Shoes 252 and 254 are slidably mounted on a track 256 which is secured at its rear end to the cross frame of the machine and is supported at its outer end by a cross beam 257 which is in turn supported by the bracket 233 and a bracket 258 mounted on the other side of the machine and secured to the cross frame thereof. The shoes 253 and 255 are slidably mounted on a track 259 which is secured at its rear end to the cross frame of the machine and supported at its forward end by the cross beam 257.

The upper set of slide plates 250 and 251 are operatively connected together by means of a pair of lever arms 260 which are secured to a transverse shaft 261 rotatably supported by the brackets 233 and 258 and which are connected at their outer ends by links 262 to the shoes 252 and 253. A lever arm 263 is mounted on the transverse shaft 261 and connected by an adjustable rod 264 to a lever arm 265 mounted on a transverse shaft 266 rotatably supported by the side frames of the machine. Lever arms 267 are secured to shaft 266 and are connected by links 268 to the shoes 254 and 255. This connecting mechanism is so arranged that when the shaft 266 is alternately rotated in opposite directions the slides 250 and 251 are alternately caused to move towards and away from each other.

The lower set of slide plates 269 and 270 are slidably supported and operatively connected by an arrangement of parts similar to that described with respect to the slide plates 250 and 251, such mechanism comprising the shoes 252' and 253' upon which the plate 269 is mounted and the shoes 254' and 255' upon which the plate 270 is mounted. Shoes 252' and 254' are slidably mounted on the track 156' while shoes 253' and 255' are slidably mounted on the track 259'. The tracks 256' and 259' are secured at their inner ends to the cross frame of the machine and at their outer ends are mounted on a cross beam 271 (see Figs. 26 and 27). The means connecting the slide plates 269 and 270 include the pair of lever arms 260', links 162', shaft 161' which is rotatably supported by the side frames of the machine, adjustable rod 264', lever arm 265' mounted on transverse shaft 266', lever arms 267' and links 268', all such parts being arranged to move the slides toward and away from each other in the same manner as the corresponding connecting parts of slide plates 250 and 251 when shaft 266' rotates in one direction or the other.

Shafts 266 and 266' are connected together by means of the lever arm 272 mounted on shaft 266, lever arm 273 mounted on shaft 266' and the cross adjustable rod 274 connecting the outer ends of the levers 272 and 273. It will be seen therefore that as shaft 266' rotates to move the slide plates 269 and 270, shaft 266 will be also actuated to move the slide plates 250 and 251, such lever arms 272 and 273 and rod 274 being so arranged that on actuation of the shafts 266 and 266', plates 250 and 269 and plates 251 and 270 move in unison.

The mechanism for applying rotative movement to the shafts 266 and 266' comprises a lever arm 275 which is affixed to the shaft 266' and is connected by an adjustable connecting rod 276 to one arm of a bell crank lever 277 rotatably mounted on the shaft 249 of the machine, the other arm of which is provided with a cam roller 278 which engages with the external camface provided on the cam 227.

In view of the foregoing description of the cover supporting means, it will be understood that normally the upper set of plates 250 and 251 and the lower set of plates 269 and 270 are retracted so that as the cover blank leaves the stop plate 202 in its travel from station I to station J it will pass between such sets of plates as is shown in Fig. 27, the upper and lower plates 250 and 269, respectively, forming one guideway for the blank and the upper and lower plates 251 and 270 forming the other guideway for such blank. The lower plates 269 and 270 are preferably beveled or turned down along those edges thereof which are adjacent the leaving edge of the stop plate 202' so as to enable the blanks to move readily into the guideways formed by the slide plates. The slide plates 250 and 251 and 269 and 270 extend sufficiently across the path of travel of the cover blank to prevent the blank from being displaced vertically with respect to the table from the position in which it was placed by the tamping plate 230 and to prevent the cover disc from falling out of the cover blank during this portion of the table's travel as is clearly shown in Fig. 27. When the blank arrives at station J and the table 200 comes to rest the clamping members of the lower beading unit will be actuated to engage the interior surfaces of the blank, as will be hereinafter explained, and just prior to the entering of such clamping members into the interior of such blank, the external cam surface of the cam 227 will through the above described connections to the shoes of such slide plates, actuate the latter to spread them apart and thereby enable the beading mechanisms to perform their operations on the blank. The slide plates will be maintained in spread position by the external cam surface of the cam 227 until the beading mechanisms have finished the beading operations and are being withdrawn, whereupon the cam roller will ride down off the external cam surface and onto the exterior surface of the cam 227. The slide plates will thereupon be actuated to the retracted or normal position by means of a coiled spring 280 which surrounds a rod member 281 pivotally connected at its upper end to that arm of the crank lever 277 to which the adjustable rod 276 is connected and extending at its lower end into an aperture provided in the base of the machine as is shown in Fig. 27. The spring 280 which is seated at its lower end on the base of the machine and at its upper end against an adjustable nut 282, is normally biased to maintain the cam roller 278 in contact with the exterior surface of the cam 227 and will be compressed when such cam rides up on the external cam surface of such cam through the nut 282, the rod member 281 and the crank arm to which the latter is connected.

Cover beading means

At station J of this machine, as in the first embodiment there are provided two beading units for simultaneously beading the top and bottom edges of the blank, one of such units being positioned below the level of the turn table 200 and the other of such units being positioned above the level of the turn table.

The lower beading unit (Figs. 27 and 28) is substantially similar in construction to the beading units of the first embodiment and includes a vertically disposed actuating shaft 105' which extends through a hollow shaft 111' and has provided on its upper end a link head 136' to which are connected the toggle links 134' and 135' for actuating the blocks 132' slidably mounted on the annular support 127' and carrying the clamping segments 133'. The hollow shaft 111', like shaft 111, is confined to movement in a vertical direction by means of a pair of vertically spaced bearings 285 and 286 provided on the bracket 287 which is mounted on the cross frame of the machine. The support 127' on the upper end of shaft 111' is similar in construction to the support 127 of the first embodiment and the arrangement and construction of the housing member 121', pulley 123' and spinning die 125' on such shaft 111' are likewise similar to those of the first embodiment. As in the first embodiment, the shaft 105', the shaft 111' and the die 125' are actuated by three separate lever arms, the die 125' being connected to its associated lever arm through a sleeve 117' similar to that of the first embodiment, the shaft 111' through the cylindrical collar 113' as in the first embodiment and the shaft 105' through a collar 288 fixedly connected thereto. The lever arm 289 which is connected to sleeve 117' is mounted on shaft 244 which, as has been described hereinabove, is connected to the cam 228 through the lever arm 245, the adjustable connecting rod 246 and the bell crank lever 247. Lever arm 290 connects the collar 113' of shaft 111' with a shaft 291 on which it is mounted and which through the lever arm 292 mounted on such shaft, the adjustable connecting rod 293 and the bell crank lever 294 is connected to cam 226. The collar 288 on shaft 105' is connected by a link 295 to one arm of a bell crank lever 296, rotatably supported by the bracket 287 and having its other arm slidably connected by means of a collar 297 to a connecting rod 298. Mounted on the rod 298 on either side of the collar 297 and seated against the side faces of the latter are a pair of springs 299 and 300, the spring 299 having its other end seated against an adjustable nut 301 which is locked in position on the rod 298 and the other end of spring 300 being seated against a collar 302 secured to the rod 298. The rod 298 is connected to one arm of a bell crank lever 303 whose other arm is provided with a cam roller 304 which engages with the internal cam groove of cam 227.

The operation of the several parts of the lower beader unit of this machine while connected in a somewhat different manner to the operating cams from that of the first embodiment, is similar in all respects to the first embodiment and it is believed unnecessary to enter again into a detailed explanation of the operation of such parts. Suffice it to say that like the first embodiment, shafts 105' and 111' are initially lifted simultaneously under the actions of cams 226 and 227 while the beading mechanism on sleeve 117' is maintained in stationary position by the cam 228. During the upward movement of the shafts 105' and 111', the support 127' and the sliding blocks 132' and clamping segments 133' pass between the lower slide plates 269 and 270 supporting the lower edge of the cover blank and lift the cover disc to the position indicated in Fig. 28. On continued rotation of the cams, the upward travel of the shaft 111' is discontinued while shaft 105' continues its upward movement to move the segments 133' into clamping engagement with the interior surfaces of the cover blank, such clamping engagement being of a yielding nature by reason of the springs 299 and 300. During this movement of the parts the slide plates 250, 251, 269 and 270 are withdrawn and cam 228 actuates the sleeve 117' to bring the beading die 125' into engagement with the lower edge of the cover blank. On continued upward movement of the beading die 125', during which period both the shafts 105' and 111' are stationary, the die 125' beads the lower edge of the blank in the manner indicated in Figs. 22 and 28. At the end of the beading operation the parts are withdrawn in reverse order as has been previously explained leaving the slide plates 250, 251, 269 and 270 in their retracted or normal positions and the beading unit in its lowermost or at rest position ready for the next succeeding blank to be brought into position at this station.

*Upper cover beading unit*

The upper beading unit of this embodiment is unlike the lower beading unit thereof and the beading units of the first embodiment, in that it does not include the clamping devices and actuating means therefor, but is somewhat similar to such devices in the construction and arrangement of the beading mechanism. As can be seen more clearly in Figs. 27 and 28, the upper beading unit includes a vertical shaft 310 which is rotatably supported by the spaced bearings 311 and 312 provided on the spaced arms of the bracket 313 which is secured as by bolts to the cross frame of the machine. Slidably mounted on the shaft 310 is a sleeve 314, pulley 315, annular member 316 and spinner die 317 which are constructed and arranged similar to the sleeve 117', pulley 123', annular member 121' and die 125' of the lower unit except that the annular member and die are made integral with each other instead of being separate as is the case in the lower unit. The sleeve 314 is supported by and connected to the shaft 240 by a lever arm 318 which is secured to such shaft. As shaft 240 is connected by the lever arms 241 and 243 and connecting rod 242 to shaft 244 which is actuated by the spinner actuating cam 228, it will be seen that the spinner die 317 will partake of the same movements as the die 125' and will function to spin the upper edge of the cover blank simultaneously with the latter.

As in the first embodiment, the spinner mechanism of the upper and lower beading units of this machine are each continuously driven by a separate motor, the spinner of the lower unit being driven by the motor 320 which is connected to the pulley wheel 123' thereof by the compound belt 321 while the spinner of the upper unit is driven by the motor 322 which is connected to the pulley wheel 315 thereof by the compound belt 323. The motors 320 and 322 which are secured to the interior sides of the side frames as is shown in Fig. 25, are arranged to drive the two spinner mechanisms in opposite directions so as to prevent any turning movements of the blank during the spinning operations.

While the beading units and operating mechanisms therefor of this embodiment are shown as being fixedly secured to the frames of the machine, it will be understood that adjustability of such units may be provided for in a manner similar to that illustrated in the first embodiment.

Cover ejecting means

On the next rotative movement of the table 200 the beaded cover blank with its cover disc now secured in position by the inturned beaded edges thereof, is moved from station J to station K where ejecting means come into operation to push the beaded blank through the holder 201 carrying it onto the stop plate 202. This ejecting means is somewhat similar in construction to the tamping mechanism at station I and includes an ejector plate 325 (see Fig. 24) having its diameter less than the interior diameter of the holders 201 and being affixed to the lower end of a vertically disposed rod 326, the latter of which is arranged for vertical movement in the aligned guideways provided on the outer ends of the vertically spaced brackets 258 and 327 bolted to the cross frame of the machine. Intermediate the brackets 258 and 327, there are provided a pair of spaced collars 328 and 329 which are affixed to the rod 326, a coiled spring 330 seated on the collar 328 and a slidably mounted collar 331 positioned intermediate the upper end of the spring 330 and the collar 329 and operatively connected to a lever arm 332.

It will be evident from the foregoing that when the lever arm 329 is pivoted downwardly to move the ejector plate 325 into engagement with the beaded upper edge of the cover blank disposed therebelow, such plate and the rod 326 will move downwardly under their own weight until the plate 325 rests on the cover blank, whereupon the collar 331 will press against the upper end of the spring 330 and through such connection will yieldingly force the cover blank out of the holder and onto the upper surface of the stop plate 202. On the upward movement of the lever arm 332, the plate 325 is lifted through the engagement of collar 331 with collar 329. The lever arm 332 like the lever 238 of the tamping mechanism and the lever arm 318 of the upper beading unit is mounted on the horizontal transversely extending shaft 240 so that it is rotated with such lever arms from the cam 228.

On the next rotative movement of the table 200 from station K to station L the latter of which, as has previously been mentioned, is an idle station, the ejected cover blank is pushed along the stop plate 202 by the holder 201 from which it has been ejected until it comes to an aperture 334 in such stop plate whereupon it drops through such aperture into a discharge chute 335 (see Fig. 24). The discharge chute 335 deposits the blank upon a traveling conveyor which forms part of a waxing device.

The cover waxing device as shown in part in Figs. 24 and 25 of the drawings, includes a raised frame supporting an elongated tank which is filled with a wax such as paraffin. Extending through the tank and positioned close below the surface of the wax is a stationary track composed of the spaced members 337 and 338, the space between such members being less than the width of the beaded cover blank and the overall width of such members and the space therebetween being only slightly greater than the width of the blank. The track members 337 and 338, at the delivery end of the device or to the right, as viewed in Fig. 29, extend substantially horizontally under the delivery end of the chute 335, then incline downwardly into the bath. The blanks are maintained in vertical position on the tracks 337 and 338 by guide rails 343. The covers are carried on a conveyor composed of two endless chains 349 and 350 and the transverse connecting bars 351, the latter of which are spaced in such chains at intervals greater than the exterior diameter of the cover blank.

From the foregoing description of the cover machine it will be apparent that this machine is well adapted for the purposes for which it was intended and it is believed that in view of the basic similarity of its construction to that of the first embodiment and the description given hereinabove, that a detailed description of its general operations is unnecessary.

Having thus illustrated and described two embodiments of my invention, it will be obvious to those skilled in the art that other changes in the form, construction and arrangement of the several parts may be resorted to without departing from the spirit and scope of the invention and hence I do not wish to limit myself strictly to the structures herein set forth.

I claim:

1. In a container forming machine, the combination of a horizontally rotatable support having a plurality of tubular shaped holders adapted to retain tubular shaped blanks inserted therein with their ends projecting therefrom, means for rotating said support to advance said holders step by step along a continuous prescribed path, means for defining the inserted position of the blanks within said holders, a pair of vertically aligned beading units disposed on opposite sides of said support, each of said beading units including a beading die presenting an annular shaped groove adapted to receive the adjacent end of a tubular blank, means for vertically moving said beading units simultaneously into and out of engagement with the projecting ends of a blank positioned therebetween, and means for rotating the dies of said beading units in opposite directions.

2. In a container forming machine, the combination of a horizontally rotatable support having a plurality of holders adapted to retain annularly shaped blanks with their ends projecting therefrom, means for rotating said support to advance said holders step by step along a continuous prescribed path, means for defining the inserted position of the blanks within said holders, a pair of vertically aligned beading dies disposed on opposite sides of said support, means for vertically moving said beading dies simultaneously into and out of engagement with the projecting ends of a blank positioned therebetween, clamping means movable relative to said beading dies and adapted to enter into an annular blank disposed between such dies and to clamp it against the interior surfaces of its associated holder during the beading operations, and means for rotating said dies in opposite directions.

3. In a container forming machine, the combination of a movable support having a plurality of holders adapted to retain annularly shaped blanks with their ends projecting therefrom, a stop plate operatively associated with said support for positioning the blanks in said holders, means associated with each holder for resiliently gripping the exterior surfaces of a blank retained thereby, a pair of vertically aligned beading units disposed on opposite sides of said support, means for vertically moving said beading units simultaneously into and out of engagement with the projecting ends of a blank positioned therebetween, and clamping means adapted to enter into an annular blank disposed between such beading units and to clamp it against the interior surfaces of its associated holder during the beading operations.

4. In a container forming machine, the combination of a movable support having a plurality of holders adapted to retain annularly shaped blanks with their ends projecting therefrom, means for positioning the blanks with respect to said holders, resilient means for exteriorly releasably engaging a blank to hold it in position in its associated holder, clamping mechanism adapted to enter into an annular blank and to clamp it against the interior surfaces of its associated holder, a pair of aligned beading units disposed on opposite sides of said support, and means for moving said beading units simultaneously to bead the projecting ends of a blank positioned therebetween while the latter is gripped by said clamping mechanism.

5. In a container forming machine, the combination of a movable support having a plurality of holders adapted to retain annularly shaped blanks with their ends projecting therefrom, means for positioning the blanks with respect to said holders, means for applying wax to a projecting edge of said blank while supported in its holder, a pair of aligned beading units disposed on opposite sides of said support, means for vertically reciprocating said beading units simultaneously into and out of engagement with the projecting ends of a blank positioned therebetween subsequent to the edge-waxing operation, means for rotating the dies of said beading units in opposite directions, and means for loosening the beaded blanks from said holders.

6. In a container forming machine, the combination of a movable support having a plurality of vertically extending annularly shaped holders adapted to receive annular blanks and having a height less than the height of such blanks, a stop plate disposed on one side of said support and adapted to properly position blanks in said holders so that the ends of such blanks project therefrom a predetermined distance, means for exteriorly releasably engaging a blank to hold it in position in its associated holder, automatic means for manipulating said blank-engaging means to release the blank from its holder, clamping means adapted to engage the interior surfaces of such blank and to clamp it against such holder, a pair of vertically aligned beading units disposed on opposite sides of said support, and means for vertically reciprocating said beading units simultaneously to bead the projecting ends of a blank positioned therebetween while the latter is gripped by said clamping means.

7. In a container forming machine, the combination of a movable support having a plurality of holders adapted to retain annularly shaped blanks with their ends projected therefrom, a stop plate disposed on one side of said support, tamping means positioned on the other side of said support and operative to press a blank in a holder against said stop plate so as to position such blank properly in the holder with the ends thereof projecting from such holder, means exteriorly engaging said blank to hold it in its adjusted position in said holder, clamping means adapted to engage the interior surfaces of such blank and to clamp it against such holder, a pair of aligned beading units disposed on opposite sides of said support, and means for moving said beading units simultaneously to bead both projecting ends of a blank positioned therebetween while the latter is gripped by said clamping means.

8. In a container forming machine, the combination of a movable support having a plurality of holders adapted to retain annularly shaped blanks with their ends projecting therefrom, means for positioning the blanks with respect to said holders, means for applying wax to a projecting edge of said blank while supported in its holder, a pair of aligned beading units disposed on opposite sides of said support, means for moving said beading units simultaneously into and out of engagement with the projecting ends of a blank positioned therebetween, means for rotating the dies of said beading units in opposite directions, and means for discharging the beaded blanks from the holders of said support.

9. In a container forming machine, the combination of a movable support having a plurality of holders adapted to retain annularly shaped blanks with their ends projecting therefrom, means for positioning the blanks with respect to said holders, means associated with each of said holders for gripping the exterior surfaces of the blanks disposed therein, spring means for yieldably holding said gripping means in engagement with the blanks, and automatic means for successively withdrawing the gripping means of said holders out of engagement with the blanks retained thereby and for holding such gripping means in retracted position during a predetermined portion of the travel of said movable support.

10. In a container forming machine, the combination of a movable support having a plurality of holders adapted to retain annularly shaped blanks with their ends projecting therefrom, means for positioning the blanks with respect to said holders, a pair of shoes associated with each holder and adapted to engage the exterior surfaces of a blank retained by such holder, means pivotally supporting said shoes, spring means for normally maintaining said shoes in engagement with the blank throughout the cycle of movement of said holder, and retracting means including a cam for withdrawing said shoes against the tension of said spring means during a predetermined portion of the travel of said movable support.

11. In a container forming machine, the combination of a holder adapted to retain an annularly shaped blank with an end projecting therefrom, a beading unit including a die, means for moving said die into and out of engagement with the projecting end of the blank, a plurality of clamping members mounted for lateral movement with respect to the axis of said die, a hollow shaft slidably supporting said clamping members, an actuating shaft disposed within said hollow shaft, link elements pivotally connected to said clamping members and to said actuating shaft, and means for moving said hollow shaft and said actuating shaft together to position the clamping members within the blank and then to move said actuating shaft relative to said hollow shaft to cause said clamping members to move outwardly into engagement with the interior surfaces of the blank.

12. In a container forming machine, the combination of a holder adapted to retain an annularly shaped blank with an end projecting therefrom, a beading unit including a die, means for moving said die into and out of engagement with the projecting end of the blank, a plurality of slides mounted for lateral movement with respect to the axis of said die, clamping members mounted on said slides, a hollow shaft supporting said slides and clamping members, an actuating shaft disposed within said hollow shaft, a plurality of links connecting said slides with said actuating shaft, and means for moving said hollow shaft and said actuating shaft together to position the clamping members within the interior of the blank and then to move said actuating shaft relative to said hollow shaft to cause said slides and clamping members to move outwardly into engagement with the interior surfaces of the blank.

13. In a container forming machine, the combination of a holder adapted to retain an annularly shaped blank with an end projecting therefrom, a beading unit including a die, a plurality of slides mounted for lateral movement with respect to the axis of said die, clamping members mounted on said slides, a hollow shaft supporting said slides and clamping members, a sleeve slidably mounted on said hollow shaft, a bearing unit supporting said die on said sleeve, an actuating shaft disposed within said hollow shaft, means connecting said slides to said actuating shaft, means for moving said hollow shaft and said actuating member towards said holder to position said clamping members within the blank and then to move said actuating shaft relative to said hollow shaft to cause said clamping members to move outwardly into engagement with the interior surfaces of the blank, and means to move said die longitudinally of said shafts into engagement with the projecting end of the blank.

14. In a container forming machine, the combination of a holder adapted to retain an annularly shaped blank with an end projecting therefrom, a beading unit including a die, a plurality of clamping members mounted for lateral movement with respect to the axis of said die, a hollow shaft supporting said clamping members, a sleeve mounted for sliding movement on said hollow shaft, means rotatably supporting said die on said sleeve, an actuating shaft disposed within said hollow shaft, means connecting said clamping members to said actuating shaft, actuating means for said die, hollow shaft and actuating shaft, said actuating means being operable first to move said hollow shaft and actuating shafts together towards the holder to position the clamping members within the blank, then to move said actuating shaft relative to said hollow shaft to cause said clamping elements to grip said blank and then to move said die towards the projecting end of said blank to bead the latter, and a yieldable connection intermediate said actuating shaft and operable means adapted initially to function substantially as a rigid member and then to yieldingly press said clamping elements against the blank.

15. In a container forming machine, the combination of a tubular holder adapted to receive and support an annularly shaped blank with its ends projecting therefrom, a beading unit disposed on each side of said holder, each of said beading units including a beading die composed of an annular channeled shaped member having a plurality of transversely extending pins disposed from the bottom edge of said channel, each of said pins having a forming groove extending circumferentially around the body of the pin, means for rotatably adjusting said pins relative to said channeled member, means for moving said beading units simultaneously to enable the grooved surfaces of said pins to engage the projecting ends of a blank positioned in said holder, internal clamping means associated with each unit and movable relative thereto, means for actuating said clamping means first to enter into the open ends of said blank and then to press said blank against the interior surfaces of said holder, and means for rotating said dies in opposite directions.

16. In a container forming machine, the combination of a holder adapted to receive and support an annularly shaped blank with an end projecting therefrom, a beading unit including a die, means for moving said die into and out of engagement with the projecting end of the blank, a plurality of clamping members mounted for lateral movement with respect to the axis of said die, a hollow shaft supporting said clamping members, an actuating shaft disposed within said hollow shaft, means operatively connecting said clamping members to said actuating shaft, means for moving said hollow shaft and said actuating shaft together to position the clamping members within the blank and then to move said actuating shaft relative to said hollow shaft to cause said clamping members to move outwardly into engagement with the interior surfaces of the blank, said clamping members being each provided with an arcuately shaped depending shoulder adapted in the clamping positions thereof to cooperate with said beading die to flatten the inner side of the bead produced on the blank, and a resilient connection between said actuating shaft and said operative means adapted to yieldingly hold said clamping members in clamped position under the action of said operative means.

17. In a container forming machine, the combination of a movable support having a plurality of holders adapted to retain annularly shaped blanks with their ends projecting therefrom, means for positioning the blanks with respect to said holders, means yieldably gripping the blanks in said holders, a beading die disposed on each side of said support, means for moving said beading dies simultaneously into and out of engagement with the projecting ends of a blank positioned in said holder, clamping means movable relative to said beading dies and adapted to enter into the annular blank and to clamp it against the interior surfaces of said holder during the beading operations, an ejector plate disposed below the surface of said support, a shaft carrying said plate and arranged for movement axially of a blank disposed thereabove, means for actuating said shaft to cause said plate to push a beaded blank upwardly of said holder, and means to withdraw said yieldably gripping means from the exterior surfaces of the blank just prior to the operation of said ejector plate.

18. In a container forming machine, the combination of a movable suport having a plurality of holders adapted to retain annularly shaped blanks with their ends projecting therefrom, means for positioning the blanks with respect to said holders, a wax applicator movable into wax-applying relationship to a projecting edge of said blank while supported in its holder, a beading unit disposed on each side of said support, means for moving said beading units simultaneously into and out of engagement with the projecting ends of a blank positioned in said holder, clamping means adapted to hold the blank against rotation during the beading operations, and means for forcing the beaded blanks through said holders.

19. In a container forming machine, the combination of a movable support having a plurality of holders adapted to retain annularly shaped blanks with their ends projecting therefrom, means for positioning the blanks with respect to said holders, slides mounted for lateral movement above and below said support, means normally maintaining said slides in retracted position, means for beading the projecting ends of the blanks, and means for simultaneously reciprocating said beading means, means operable to project said slides into the annular blanks, and means operative to expand said slides to move the bodies into clamping engagement against the interior surfaces of their associated holders and withdraw said slides to release said blanks after said clamping means have been positioned within the blanks.

20. In a container forming machine, the combination of a movable support having a plurality of holders adapted to retain annularly shaped blanks with their ends projecting therefrom, a stationary stop plate disposed below said support, means for tamping the blanks against said plate, a plurality of slides bearing guide plates and normally disposed so that said plates form a passageway through which the blanks are pushed by said support, beading devices disposed above and below said guide plates, clamping mechanism adapted to enter into the blanks and to clamp them against the interior surfaces of said holders, said guide plates being formed to enable said clamping mechanism to pass therebetween and into the interiors of the blanks, and means to withdraw said guide plates from the blanks just prior to the engagement of the dies of said beading devices with the projecting ends of the blanks.

21. In a container forming machine, the combination of a horizontally rotatable support having a plurality of tubular shaped holders each adapted to retain a tubular shaped container blank inserted therein, means for rotating said support to advance said holders step by step along a continuous prescribed path through a plurality of operating stations, a stop plate positioned below said support at one of said stations for defining the position of the tubular container blanks inserted into said holders as they progressively arrive at said insertion station, means for tamping the blanks against said plate, a beading unit disposed on each side of said support at another of said stations, and means for moving said beading units simultaneously into and out of engagement with the projecting ends of the blank at said beading station.

22. In a container forming machine, the combination of a horizontally rotatable support having a plurality of tubular shaped holders each adapted to retain a tubular shaped container blank inserted therein, means for rotating said support to advance said holders step by step along a continuous prescribed path through a plurality of operating stations, a stop plate positioned below said support at one of said stations operative to define the inserted position of the tubular container blank inserted into the holder at that station, a fixed bracket for supporting said plate, means for adjusting the elevation of said plate, a beading unit disposed on each side of said support at another of said stations, and means for moving said beading units simultaneously into and out of engagement with the projecting ends of the blank at said beading station.

23. In a container forming machine, the combination of a rotatable support having a plurality of tubular shaped holders each adapted to retain a tubular shaped container blank inserted therein, means for rotating said support to advance said holders step by step along a continuous prescribed path through a plurality of operating stations, a stop plate at one of said stations operative to define the inserted position of the tubular container blank inserted into the holder at that station, a fixed bracket for supporting said plate, means for adjusting the elevation of said plate, a beading unit, means for moving said beading unit into and out of engagement with one end of the blank at said beading station, and means adapted to hold the blank against rotation during the beading operation.

24. In a container forming machine, the combination of a rotatable support having a plurality of tubular shaped holders each adapted to retain a tubular shaped container blank inserted therein, means for rotating said support to advance said holders step by step along a continuous path to a plurality of operating stations, a beading unit, means for moving said beading unit into and out of engagement with one end of the blank at said beading station, means adapted to hold the blank against rotation during the beading operation, an ejector plate at another of said stations, and means for reciprocating said plate in timed relation to the step by step movement of said holders whereby to eject the container blanks therefrom when the blanks have arrived at said ejecting station.

25. In a container forming machine, the combination of a horizontal rotatable support having a plurality of tubular shaped holders each adapted to retain a tubular shaped container blank inserted therein, means for rotating said support to advance said holders step by step along a continuous path to a plurality of operating stations, a beading unit at one of said stations, means for rotating said beading unit, means for moving said unit into and out of engagement with the end of said blank at said beading station, an ejector plate positioned below said support at another of said stations, and means for vertically reciprocating said plate in timed relation to the step by step movement of said holders whereby to eject the container blanks therefrom when the blanks have arrived at said ejecting station.

26. In a container forming machine, the combination of a rotatable support having a plurality of holders each adapted to receive a tubular shaped container blank inserted therein, means for releasably clamping each of said container blanks in its respective holder, means for rotating said support to advance said holders step by step along a continuous path to a plurality of operating stations, an ejector plate positioned at one of said stations, and actuating mechanism operative to release said clamping means and reciprocate said ejector plate in timed relation when the container blanks arrive at said ejecting station.

27. In a container forming machine, the combination of a horizontal rotatable support having a plurality of tubular shaped holders each adapted to retain a tubular shaped container blank inserted therein, means for rotating said support to advance said holders step by step along a continuous path to a plurality of operating stations, a beading unit at one of said stations, means for rotating said beading unit, means for moving said unit into and out of engagement with the end of the blank at said beading station, an ejector plate positioned below said support at another of said stations, a cam member, means for continuously driving said cam member, and mechanism operatively connecting said cam member to said ejector plate to vertically reciprocate said plate in timed relation to the step by step movement of said holders whereby to eject the container blanks therefrom when the blanks arrive at said ejecting station.

28. In a container forming machine, the combination of a rotatable support having a holder adapted to receive a tubular shaped container blank inserted therein, means for rotating said support to advance said holder step by step along a continuous path to a plurality of operating stations, a clamping element associated with said holder, means normally urging said clamping element into clamping engagement with the container blank positioned within said holder, and means for moving said clamping element out of engagement with the container blank positioned in said holder when said holder arrives at a predetermined station.

29. In a container forming machine, the combination of a horizontal rotatable support having a plurality of tubular shaped holders each adapted to receive a tubular shaped container blank inserted therein, means for rotating said support to advance said holders step by step along a continuous path to a plurality of operating stations, clamping elements associated with each of said holders, a cam member relatively fixed with respect to said rotatable support, means normally urging said clamping element into clamping engagement with the container blanks positioned within said holders, and means operatively connected to said clamping elements in position for engagement by said cam member for moving said clamping elements out of engagement with the container blanks positioned in said holders when said holders arrive at a predetermined station.

30. In a container forming machine, the combination of a rotatable support having a tubular shaped holder adapted to receive a tubular shaped container blank, means for rotating said support to advance said holder to a plurality of operating stations, a clamping element associated with said holder, means for pivotally supporting said clamping element whereby said clamping element may be swung toward and away from its associated holder, means normally urging said clamping element into engagement with the container blank positioned within said holder, and mechanism operative to move said clamping element away from its associated holder at a predetermined operating station to permit insertion of the container blank into the holder at that station.

31. In a container forming machine, the combination of a horizontal rotatable support having a plurality of tubular shaped holders each adapted to receive a tubular shaped container blank, means for rotating said support to advance said holders to a plurality of operating stations, clamping elements associated with each of said holders, means for pivotally supporting said clamping elements whereby said clamping elements may be swung toward and away from their associated holders, a cam member relatively fixed with respect to said rotatable support, means normally urging said clamping elements into engagement with the container blanks positioned within said holders, and mechanism operatively connected to said clamping elements and positioned to be engaged by said cam member during rotation of said support to move said clamping elements away from their associated holders at a predetermined operating station to permit insertion of the container blank into the holder at that station.

32. In a container forming machine, the combination of a rotatable support having a tubular shaped holder adapted to receive a tubular shaped container blank, means for rotating said support to advance said holder through a plurality of operating stations, a clamping shoe associated with said holder having a portion thereof normally projecting through a corresponding opening in said holder, means normally urging said clamping shoe inwardly toward the center of said holder thereby to grip the container blank positioned therein, and means for moving said clamping shoe away from said holder at certain of said stations to permit insertion and removal of the container blank from the holder at said stations.

33. In a container forming machine, the combination of a rotatable support having a plurality of tubular shaped holders each adapted to receive a corresponding tubular shaped container blank, means for rotating said support to advance said holders through a plurality of operating stations, a plurality of clamping shoes associated with each of said holders having a portion thereof normally projecting through a corresponding opening in their associated holders, resilient means normally urging said clamping shoes inwardly toward the center of its associate holder thereby to grip the container blank positioned therein, and means for moving said clamping shoes away from its associated holder at certain of said stations to permit insertion and removal of the container blanks from the holders at said stations.

34. In a container forming machine, the combination of a rotatable support having a tubular shaped holder adapted to receive a corresponding tubular shaped container blank, means for rotating said support to advance said holder to a plurality of operating stations, a pivotally mounted lever associated with said holder, a blank clamping element carried by said lever, a cam member relatively fixed with respect to said rotatable support, and a rocker arm connected to said lever adapted to be engaged by said cam member to move said clamping element into and out of clamping position.

35. In a container forming machine, the combination of a rotatable support having a tubular shaped holder adapted to receive a corresponding tubular shaped container blank, means for rotating said support to advance said holder to a plurality of operating stations, a pair of pivotally mounted levers associated with said holder, a blank clamping element carried by each of said levers, a cam member relatively fixed with respect to said rotatable support, a rocker arm connected to one of said levers adapted to be engaged by said cam member to move its associated clamping element into and out of clamping position, and means operatively connecting said paired levers whereby each pair of clamping elements may be manipulated in unison by said rocker arm.

36. A beading unit operative to bead the end of a tubular paperboard body member including, a hollow support, an annular beading die rotatably mounted on said support, driving mechanism for rotating said beading die, a clamping device reciprocably supported on said hollow support including laterally movable clamping elements, a shaft extending through said hollow support operatively connected to said clamping elements, mechanism connected to said tubular support for manipulating said beading unit, mechanism operatively connected to said clamping device for independently manipulating said clamping device, and mechanism operatively connected to said shaft for independently manipulating said clamping elements.

37. A beading unit operative to bead the end of a tubular paperboard body member including, a hollow support, an annular beading die rotatably mounted on said support, driving mechanism for rotating said beading die, a clamping device supported by said hollow support including laterally movable body clamping elements, a shaft extending through said hollow support operatively connected to said clamping elements, a lever operatively connected to said tubular support for manipulating said beading unit, a lever operatively connected to said clamping device for manipulating said clamping device, and a lever connected to said shaft for manipulating said clamping elements.

38. A beading unit operative to bead the end of a tubular paperboard body member including, a hollow support, an annular beading die rotatably mounted on said support, driving mechanism for rotating said beading die, a clamping device supported by said hollow support including laterally movable body clamping elements, a shaft extending through said hollow support operatively connected to said clamping elements, cam and lever mechanism operatively connected to said tubular support for raising and lowering said beading unit, cam and lever mechanism operatively connected to said clamping device for raising and lowering said clamping device, cam and lever mechanism for reciprocating said shaft to manipulate said clamping elements, and means for driving said cams in synchronism.

39. A beading unit operative to bead the end of a tubular paperboard body member including, a hollow support, an annular beading die rotatably mounted on said support, a tubular member reciprocably supported by said hollow support, clamp supporting means fixed to the end of said tubular member, clamping elements carried by said clamp supporting means, a shaft extending through said hollow member operatively connected to said clamping elements, mechanism operatively connected to said hollow support for manipulating the beading unit, mechanism operatively connected to said clamping device for manipulating said clamping device, and mechanism connected to said shaft for manipulating said clamping elements.

40. A beading unit operative to bead the end of a tubular paperboard body member including, a hollow support, an annular beading die rotatably mounted on said support, a tubular member reciprocably supported by said tubular support, clamp supporting means fixed to the end of said tubular member, clamping elements carried by said clamp supporting means, a shaft extending through said hollow member operatively connected to said clamping elements, cam and lever mechanism operatively connected to said hollow support for raising and lowering the beading unit, cam and lever mechanism operatively connected to said clamping device for independently raising and lowering said clamping device, cam and lever mechanism connected to said shaft for manipulating said clamping elements, and means for driving said cams in synchronism.

41. A beading unit operative to bead the end of a tubular paperboard body member including, a hollow support, an annular beading die rotatably mounted on said support, a tubular member reciprocably supported by said tubular support, clamping elements carried by said tubular member, a shaft extending through said hollow member operatively connected to said clamping elements, cam and lever mechanism operatively connected to said hollow support for manipulating the beading unit, cam and lever mechanism operatively connected to said clamping device for manipulating said clamping device, cam and lever mechanism connected to said shaft for manipulating said clamping elements, and an adjustably mounted support for all of said cams and levers.

ALBERT F. MILLER.